(12) United States Patent
Solberg

(10) Patent No.: US 11,097,413 B2
(45) Date of Patent: Aug. 24, 2021

(54) TOOL FOR TRANSFERRING POSITIONS OF MEASUREMENT REFERENCES

(71) Applicant: Dan Solberg, Kristiansand S (NO)

(72) Inventor: Dan Solberg, Kristiansand S (NO)

( * ) Notice: Subject to any disclaimer, the term of this patent is extended or adjusted under 35 U.S.C. 154(b) by 143 days.

(21) Appl. No.: 16/478,555

(22) PCT Filed: Jan. 24, 2018

(86) PCT No.: PCT/EP2018/051754
§ 371 (c)(1),
(2) Date: Jul. 17, 2019

(87) PCT Pub. No.: WO2018/138168
PCT Pub. Date: Aug. 2, 2018

(65) Prior Publication Data
US 2019/0344427 A1    Nov. 14, 2019

Related U.S. Application Data

(63) Continuation of application No. PCT/EP2018/051754, filed on Jan. 24, 2018.

(30) Foreign Application Priority Data

Jan. 24, 2017 (NO) .................................... 20170107

(51) Int. Cl.
*B25H 7/04* (2006.01)
*B28D 1/22* (2006.01)

(52) U.S. Cl.
CPC .................................... *B25H 7/04* (2013.01); *B28D 1/22* (2013.01)

(58) Field of Classification Search
CPC .... B25H 7/04; B25H 7/02; B28D 1/22; E04F 21/0092; E04F 21/0076; G01B 3/14; B26F 1/38
(Continued)

(56) References Cited

U.S. PATENT DOCUMENTS 637,373 A    11/1899  Crawford
1,417,753 A    5/1922  Lineaweaver
(Continued)

FOREIGN PATENT DOCUMENTS

CN    102454290 A    5/2012
KR    101574329 B1   12/2015
(Continued)

OTHER PUBLICATIONS

Estorgues, M., "International Search Report" for PCT/EP2018/051754, dated Apr. 24, 2018, pp. 1-4.

*Primary Examiner* — Yaritza Guadalupe-McCall
(74) *Attorney, Agent, or Firm* — Shackelford, Bowen, McKinley & Norton, LLP

(57) ABSTRACT

The invention relates to a tool for transferring positions of a measuring reference from a construction frame (not shown) to a surface of a tile or a number of adjacent tiles (31) for making cut-outs in said tile or tiles (31), said tool (1) comprising a frame-like structure (3) and a grid structure (6) having openings in a raster pattern or a grid pattern made up by laser beams, said grid structure or pattern (6) extending between elements of the frame-like structure (3). The tool is distinctive in that the tool (1) further comprises at least one leg arrangement (2) with an end portion (7), said end portion (7) having spacer element (7b) having a width equal to normal spacing between two adjacently mounted tiles (31) or between a mounted tile and a construction element, such that when measuring the position (34) for the cut-out to be transferred, when transferring the cut out positions to the tile (31) or tiles (31) to be mounted, said end portion (7b) is adapted to rest against a mounted tile (31) or an end construction element at the opposite side of the spacer element (7b).

15 Claims, 31 Drawing Sheets

(58) Field of Classification Search
USPC .......................................................... 33/527
See application file for complete search history.

(56) References Cited

U.S. PATENT DOCUMENTS

| | | | | |
|---|---|---|---|---|
| 2,529,939 | A | | 11/1950 | Higgins |
| 3,672,064 | A | | 6/1972 | Elkins et al. |
| 4,135,338 | A | * | 1/1979 | Malavasi ............ E04F 13/0892 52/387 |
| 4,212,110 | A | | 7/1980 | Hill, Jr. |
| 4,228,592 | A | | 10/1980 | Badger |
| 5,188,013 | A | * | 2/1993 | Cardinale .............. B26D 1/045 33/527 |
| 5,222,303 | A | | 6/1993 | Jardine |
| 5,309,642 | A | | 5/1994 | McGinnis |
| 5,832,619 | A | * | 11/1998 | Volkema, Jr. ....... E04F 21/1883 33/527 |
| 6,101,730 | A | * | 8/2000 | Marino .................. B28D 1/225 33/456 |
| 6,481,112 | B1 | * | 11/2002 | White .................... B28D 1/225 33/42 |
| 6,523,272 | B1 | | 2/2003 | Morales |
| 7,140,120 | B1 | * | 11/2006 | Huttemann .............. G01B 3/30 33/526 |
| 7,891,108 | B1 | | 2/2011 | Cordobes |
| 2003/0033724 | A1 | | 2/2003 | Barbosa |
| 2007/0193049 | A1 | | 8/2007 | Vetromila |
| 2012/0186094 | A1 | | 7/2012 | Cornelius |
| 2019/0344427 | A1 | * | 11/2019 | Solberg .................... B25H 7/02 |

FOREIGN PATENT DOCUMENTS

| | | | |
|---|---|---|---|
| NO | 20160926 | A1 | 12/2017 |
| WO | WO-2017207612 | A1 | 12/2017 |
| WO | WO-PCT/EP2017/063123 | | 12/2017 |
| WO | WO-2018138168 | A1 * | 8/2018 ............... B25H 7/04 |

* cited by examiner

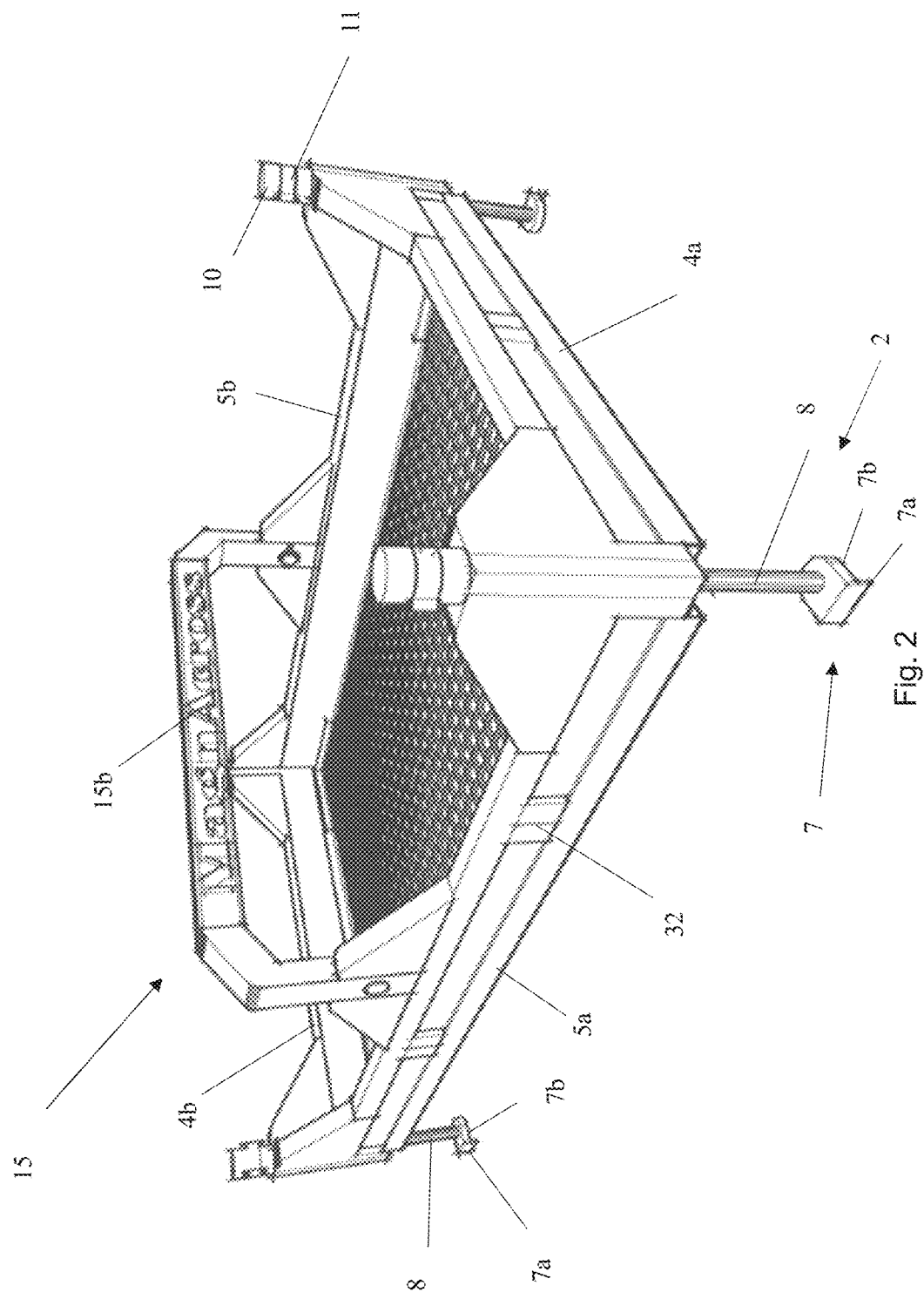

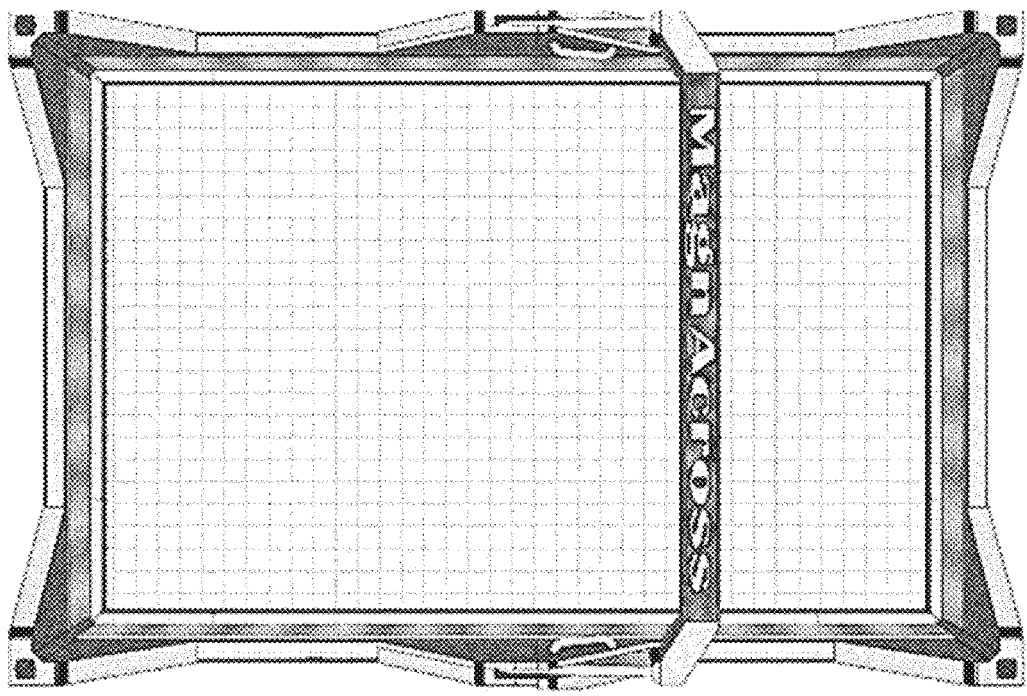
Fig. 20e1

TOOL FOR TRANSFERRING POSITIONS OF MEASUREMENT REFERENCES

FIELD OF THE INVENTION

The present invention relates to a tool for transferring positions of measuring references from a construction element to a surface of a tile or tiles, as defined in the preamble of the subsequent claim 1.

BACKGROUND OF THE INVENTION AND PRIOR ART

There exist many solutions for measuring accurate positions on a planar surface.

U.S. 637373 describes a framing square for use in carpentry. It consists of a set of rulers of which some form a frame and at least one can be set at different angles relative to the frame. Thereby the square can be used in different ways to measure workpieces.

U.S. Pat. No. 2,529,939 describes a similar carpentry measurement frame with rulers that can be set at different angles for determining cutting angles of workpieces.

None of the two above tools is suitable for measuring the position of outlets or the like in a wall or transferring the positions easily to a tile or a number of adjacent tiles.

U.S. Pat. No. 4,228,592 also describes a carpenter measuring tool that can be used to measure the position of cut-outs in a panel. It comprises a slider that runs on a T-square. The slider can be positioned over an outlet and the slider has an opening with markings indicating standard cut-out sizes. In one embodiment the tool has only one T-square and in another embodiment the tool has two T-squares set at right angles.

In the embodiment with only one T-square it is possible to measure only one of the two necessary directions at a time. Even with two T-squares the apparatus is very cumbersome to use, especially for one person only. Only one cut-out can be measures at a time and care must be taken to measure the various object relative to the same lines (floor, ceiling, corner etc.).

U.S. Pat. No. 1,417,753 describes a plotter with a rectangular frame and two crossing rulers within the frame. The rulers can slide relative to the frame and one another. The device is intended to be used to plot lines and the like on a sheet of paper.

U.S. Pat. No. 3,672,064 describes an apparatus for indexing cut-outs to be formed in a panel with respect to objects and fixtures in the wall. It comprises two arms that are set at right angles to one another. Each arm can be extended from a box arranged at their crossing point. The box contains pins that are to be placed on the outside or inside of the object that a cut-out has to be made for. After the box has been placed over the object, the arms are extended to the floor or the corner of the room and fastened in that position. The apparatus is then placed in a proper position on the panel and a cone on the backside of the box is pressed into the panel to mark the centre of the cut-out.

This device is very cumbersome to use. It is difficult, if possible at all, for one person to use it, as the box has to be held in place on top of the object as the two arms are extended to the correct extension. Only one cut-out can be measured at a time and care must be taken to measure the various object relative to the same lines (floor, ceiling, corner etc).

U.S. Pat. No. 5,222,303 describes a template for marking the position of junction boxes or the like. It consists of a fixed rectangle with an aperture that is larger than the junction box. An arm is fixed to the rectangle. The arm has a fixed length or has a portion that is linked to the fixed length arm or attached by a serration that can be broken off.

The template is for marking the correct height in placement of junction boxes. It is therefore not suitable for use to determine the position of already installed junction boxes. It can only determine the position in one direction and is therefore unsuitable for measuring the position of junction boxes in two dimensions.

U.S. Pat. No. 5,309,642 describes a mat marking apparatus. It comprises a ruler that is to be placed against the edge of the mat. A T-square is slidable along the ruler. A cutting unit is slidable along the T-square. The cutting unit has a cutting knife and an aperture for a pencil.

The apparatus is very cumbersome to use on a wall, especially for one person alone. If used on a wall, it can only measure the position of one object at a time and care must be taken to measure the various object relative to the same lines (floor, ceiling, corner etc.)

US 2007/0193049 describes a craft board assembly comprising a rectangular frame with a ruler that can slide on the frame. The device is for creating lines on a self-healing mat or a piece of paper. This device is unsuitable of measuring the positions of outlets in a wall.

U.S. Pat. No. 7,891,108 describes a tool for transferring measuring position from a construction frame to a surface lining for making cut outs having a grid for marking the positions. The tool having clamps to secure the tool in the right position for performing the marking of the cut out positions but this requires that there is a framed wall and that the tool has a size corresponding this frame. Separate clamps could also have the disadvantage that they are more easy to lose.

It has been noticed that in practical situations, the tool used by carpenters is almost exclusively a simple folding ruler or a measuring tape. This means that, for example, when fitting surface boards on a wall having electrical outlets or water outlets, the tradesman must first measure the distance from the floor and up to the centre of the outlet that a cut-out is to be made for (alternatively from the ceiling) and then measure the distance from where one edge of the surface board is to be placed to the centre of the outlet. Both these measurements have to be written down on a piece of paper (unless the apprentice has confidence in his short time memory). Then the same measurements have to be measured on a surface board and a pencil mark has to be made. It is vital that the distance is measured from the correct edge of the board. Any errors here may result in the surface board having to be discarded and the process must be repeated.

It is not uncommon that the cut-out turns out to be a mirror image or inverted of what it is supposed to be. This can be acceptable if the board can be turned inside out or around, but that is mostly not possible, for example if the two sides of the board are non-identical in terms of surface finish, or such.

If the measurement is done with insufficient accuracy, the board will not fit over the measuring reference, such as an outlet. Then the board has to be removed and the cut-out expanded until it fits the measuring reference. This is time consuming and it often results in a too large cut-out that may have to be patched up later. In many cases the board has to be discarded due to measurement errors.

Even if the measurements are correctly transferred to the board, the commonly used method is still time consuming. If a similar process has to be repeated on multiple boards that require similar cut-outs, the method has to be repeated for each and every board and for each cut-out that has to be made in the same board.

Consequently, there is a need for a more accurate and quicker method of transferring the positions of the measuring references.

OBJECTS OF THE INVENTION

It is a primary object of the invention to provide a tool for transferring accurately and effectively the positions the measuring references or cut outs from a construction frame to a surface of a tile or adjacent tiles to be mounted.

It is also an object of the invention to transfer simultaneously sizes and shapes of the measuring references from the construction frame to the tile or adjacent tiles to be mounted.

It is also an object of the invention to facilitate the transfer without the user needing to know the measurement values.

It is also an object of the invention that the transfer of positions takes place in a fail-safe manner where reference lines or other markings are clear and cannot be confused.

It is also an object of the invention to provide a tool that can easily be used by a single person, without help from another person.

It is also an object of the invention to provide a tool that can be used to transfer the positions of at least one and preferably several measuring references in one operation.

It is also an object of the invention to provide a tool that can be used on uneven surfaces to transfer the measurement references with precision.

These and other objects are achieved by the features recited in the features of the accompanying independent claims.

SUMMARY OF THE INVENTION

The invention relates to tool for transferring positions of a measuring reference from a construction frame to a surface of a tile or a number of adjacent tiles for making cut-outs in said tile or tiles, said tool comprising a frame-like structure and a grid structure having openings in a raster pattern or a grid pattern made up by laser beams, said grid structure or pattern being spanned between elements of the frame-like structure. The invention is distinctive in that the tool further comprises at least one leg arrangement with an end portion, said end portion having spacer element having a width equal to normal desired spacing between two adjacently mounted tiles or between a mounted tile and a construction element, such that when measuring the position for the cut-out to be transferred, when transferring the cut out positions to the tile or tiles to be mounted, said end portion is adapted to rest against a mounted tile or an end construction element at the opposite side of the spacer element. This provides a tool for easy transferring of the positions for measuring reference.

Preferably embodiments of the tool are defined in the dependent claim, to which reference are made.

In a preferred embodiment, the tool could have a grid structure of a net comprising warp and weft thread.

In another preferred embodiment, the grid structure is smooth.

In yet another preferred embodiment the grid structure comprises a magnetic material.

In another preferred embodiment the tool having a grid pattern and at least one first laser emitter attached to a first side of said frame like structure and at least one second laser emitter attached to a second side of said frame like structure set at a right angle to said first side, said first and second laser emitters being moveable along said respective sides.

BRIEF DESCRIPTION OF THE DRAWINGS

The attached drawings show, by way of example, preferred embodiments of the tool according to the invention.

FIG. 2 shows the tool from FIG. 1 viewed from a long side of the tool.

FIG. 11a shows the tools in a measuring position, and especially using bars attached to the tool.

FIG. 11b shows the measurements transferred to the tile

FIG. 11c shows the tiles with cut-outs.

DETAILED DESCRIPTION OF THE INVENTION

In the foregoing description and hereinafter are used general terms that are to be understood as follows:

Construction frame/element: A vertical, horizontal or inclined construction frame, such as building framework forming parts of a wall, ceiling or floor structure or bulkheads in ships or similar, onto which a tile is to be attached.

Tile: an element to be mounted on a construction element that normally have a defined spacing between two adjacent elements.

Measuring reference: Any objects that needs to be marked and cut out for in said surface lining, or to just define its position in a reference surface defined by said construction frame, such as electrical junction boxes, water supply/sewage points, windows, doors, openings, wall hung toilets/basins, etc.

When examples falling within the definition of any of the above terms are used, these should be understood to encompass all possible embodiments within the above terms.

The following describes a preferred embodiment of the present invention and some relevant prior art which are purely exemplary for the sake of understanding the invention and non limiting.

Figure 1:
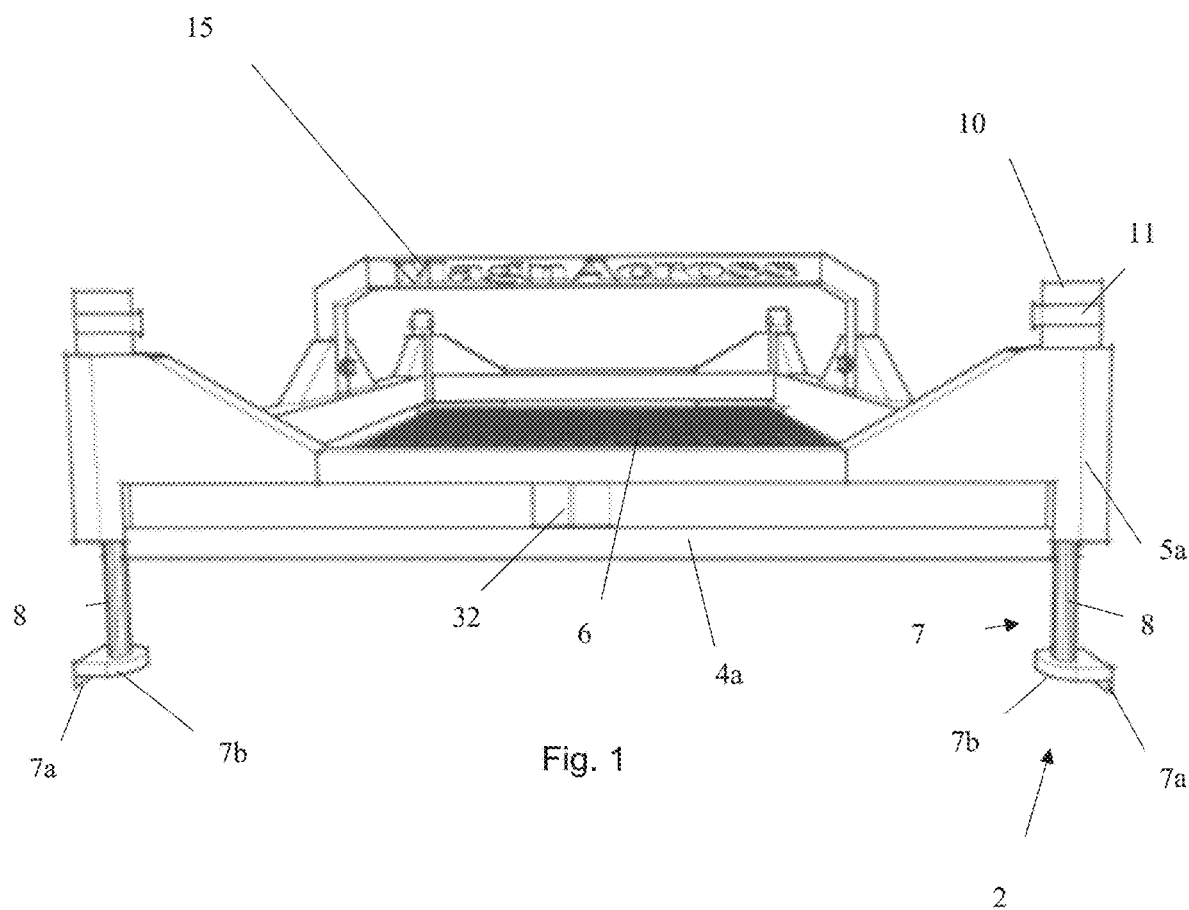
FIG. 1 shows a tool for transferring positions of measurement references to a tile or similar viewed from a short side of the tool.

FIG. 1-2 shows a tool 1 for transferring positions of measurement references to a tile or similar. The tool is viewed from different sides.

The tool 1 comprises a measuring part 3 and at least one leg arrangement 2.

The measuring part 3 comprises a frame 4 or a frame like structure 4. The frame 4 preferably has a width and length corresponding to the size of a large tile or the size of a number of smaller tiles, but the tool could also have other designs or sizes.

The frame 3 preferably has four longitudinal elements 4a, 4b, 5a, 5b. The longitudinal elements 4a, 4b, 5a, 5b that constitutes the four sides of the frame 1. Within the frame 1 there is arranged a marking grid 6 that can be realized in different forms as exemplified in some of the embodiments of the present invention in the further description.

Figure 6:
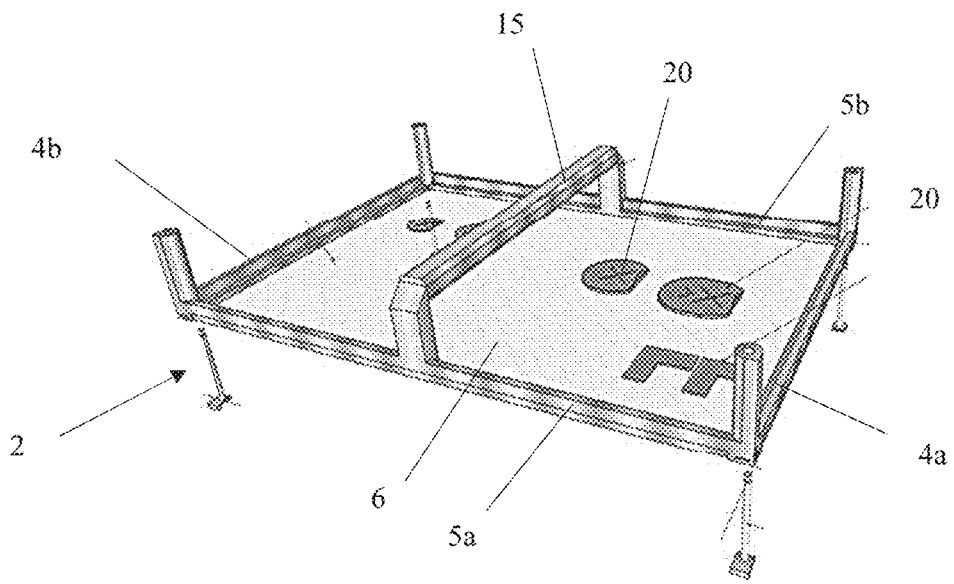
FIG. 6 shows the tool according to an embodiment of the invention with templates viewed from the side.
Figure 7:
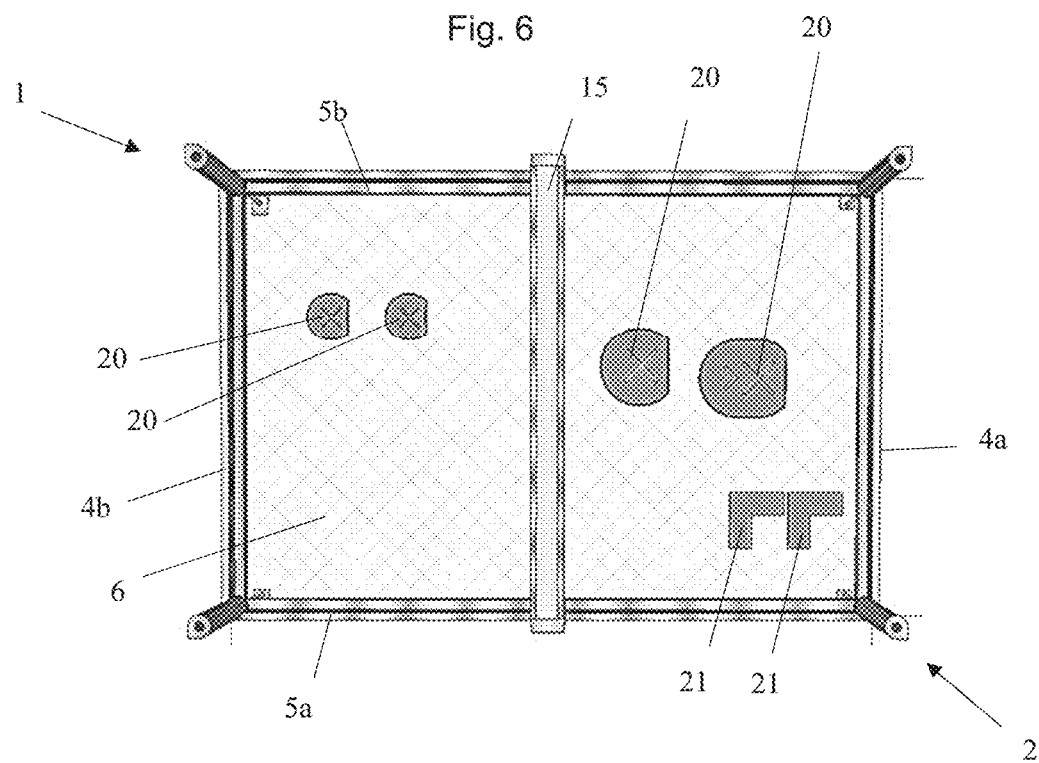
FIG. 7 shows the tool from the FIG. 6 with templates viewed from above.
Figure 8:
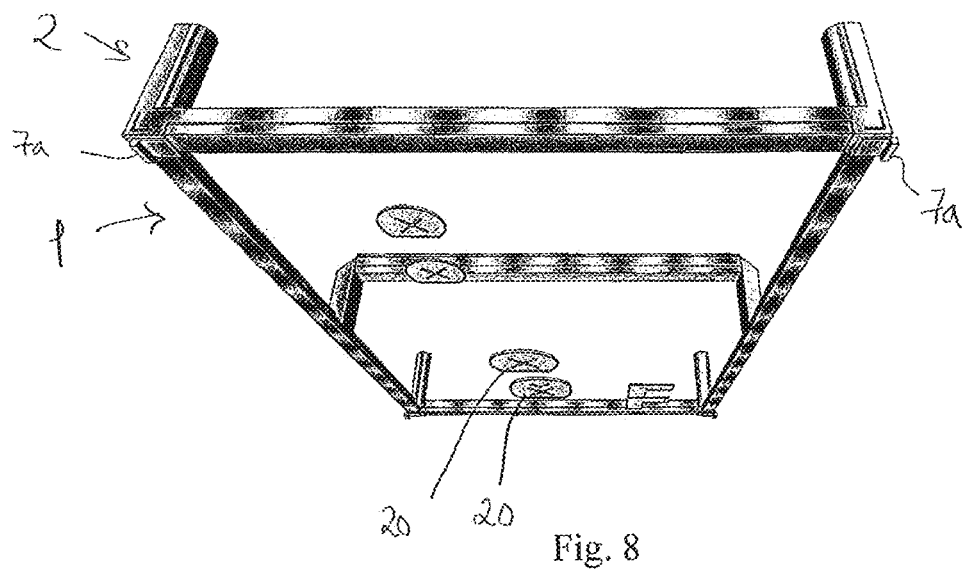
FIG. 8 shows the tool with the first leg part retracted in the leg arrangement viewed from below.

The grid structure or pattern 6 is shown as a net made up of squares with sides that are parallel with the sides of the frame 3. The grid structure or pattern 6 could also be made of a net in diamond pattern as illustrated in FIG. 6-8.

Figure 9:
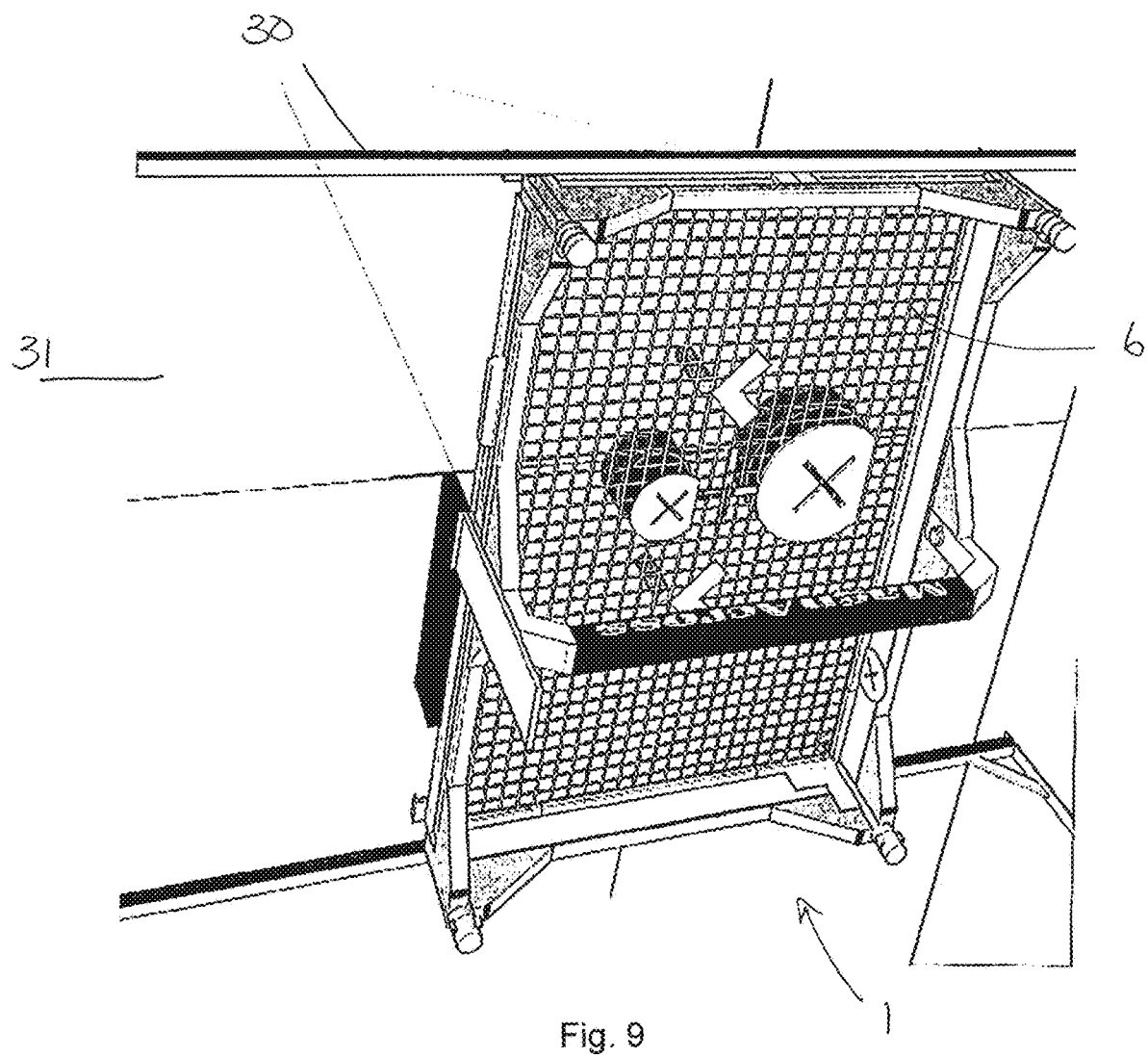
FIG. 9-11, 12-15, 17-19 shows the tool according to the invention in different position for measuring cut-outs in tiles.
Figure 14:
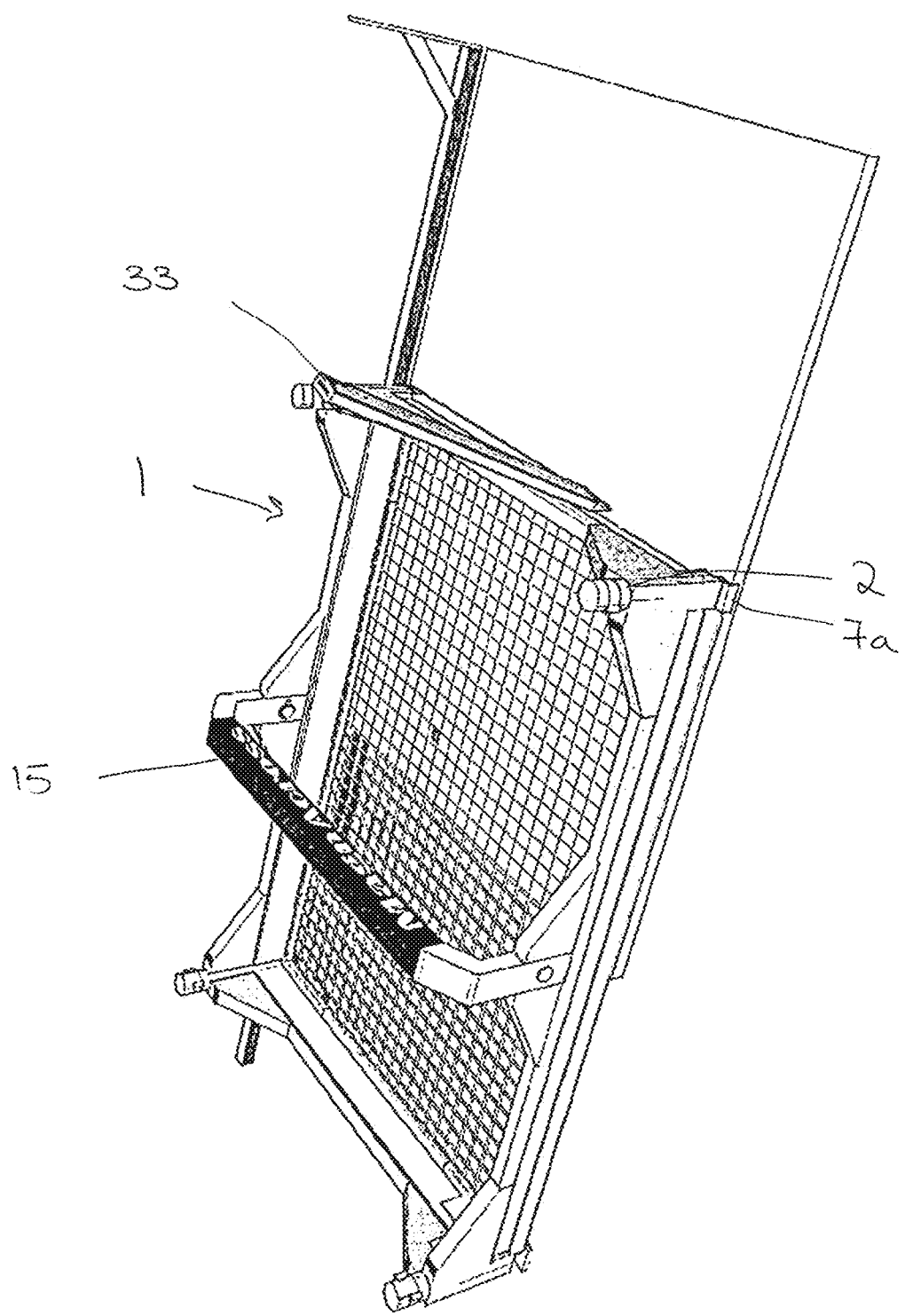
Figure 15:
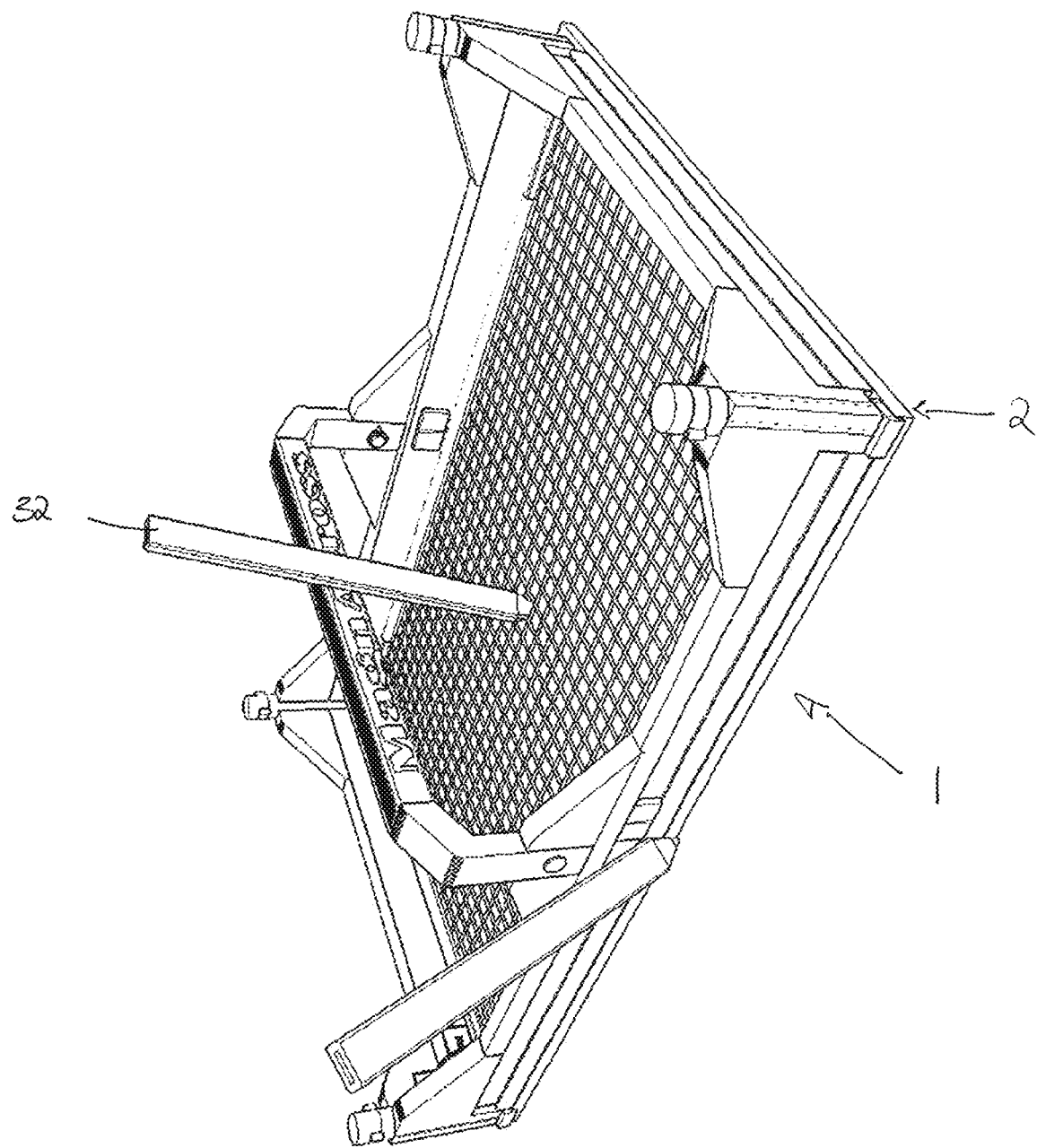
Figure 16:
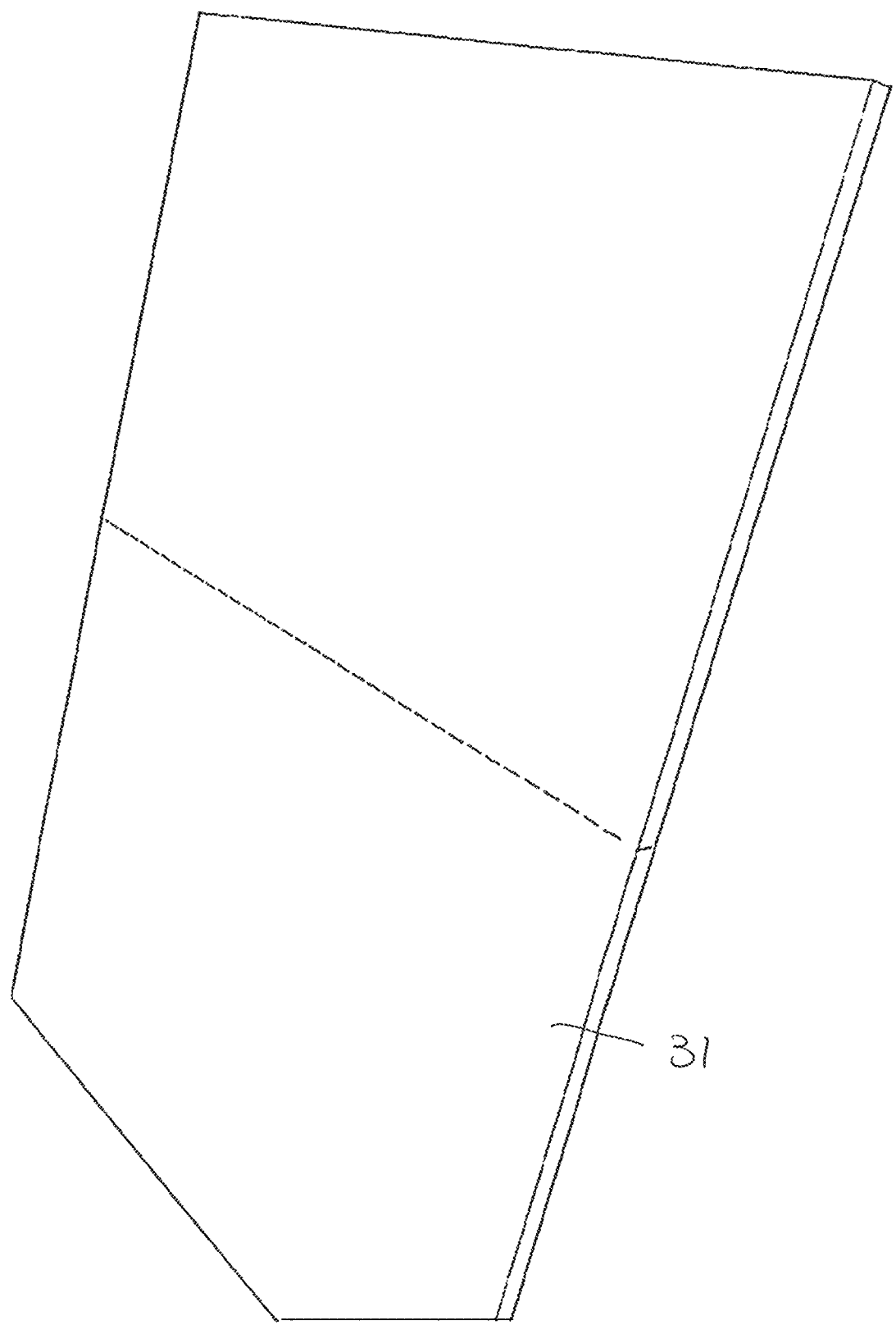
FIG. 16 shows tiles with marking.
Figure 17:
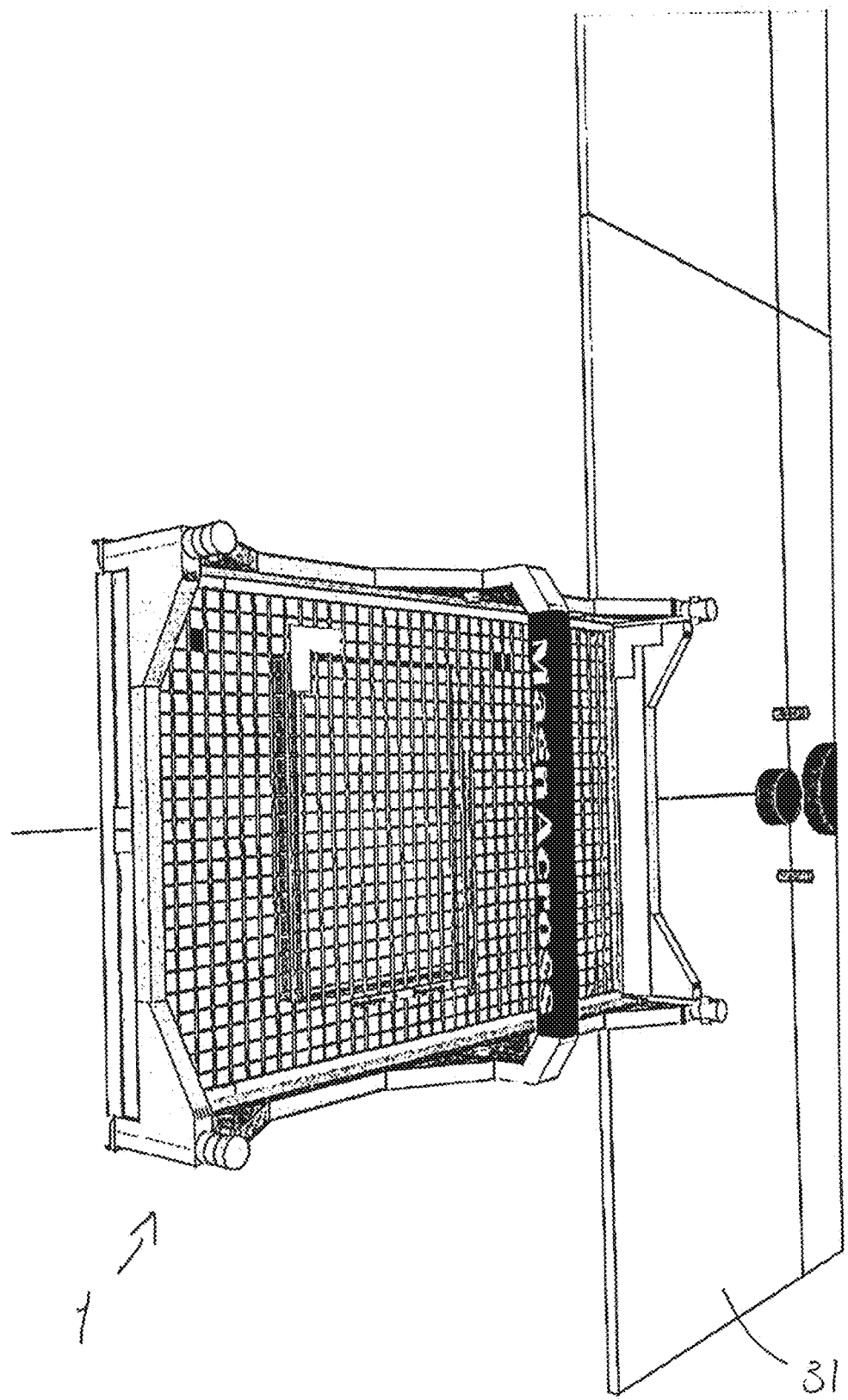
Figure 18:
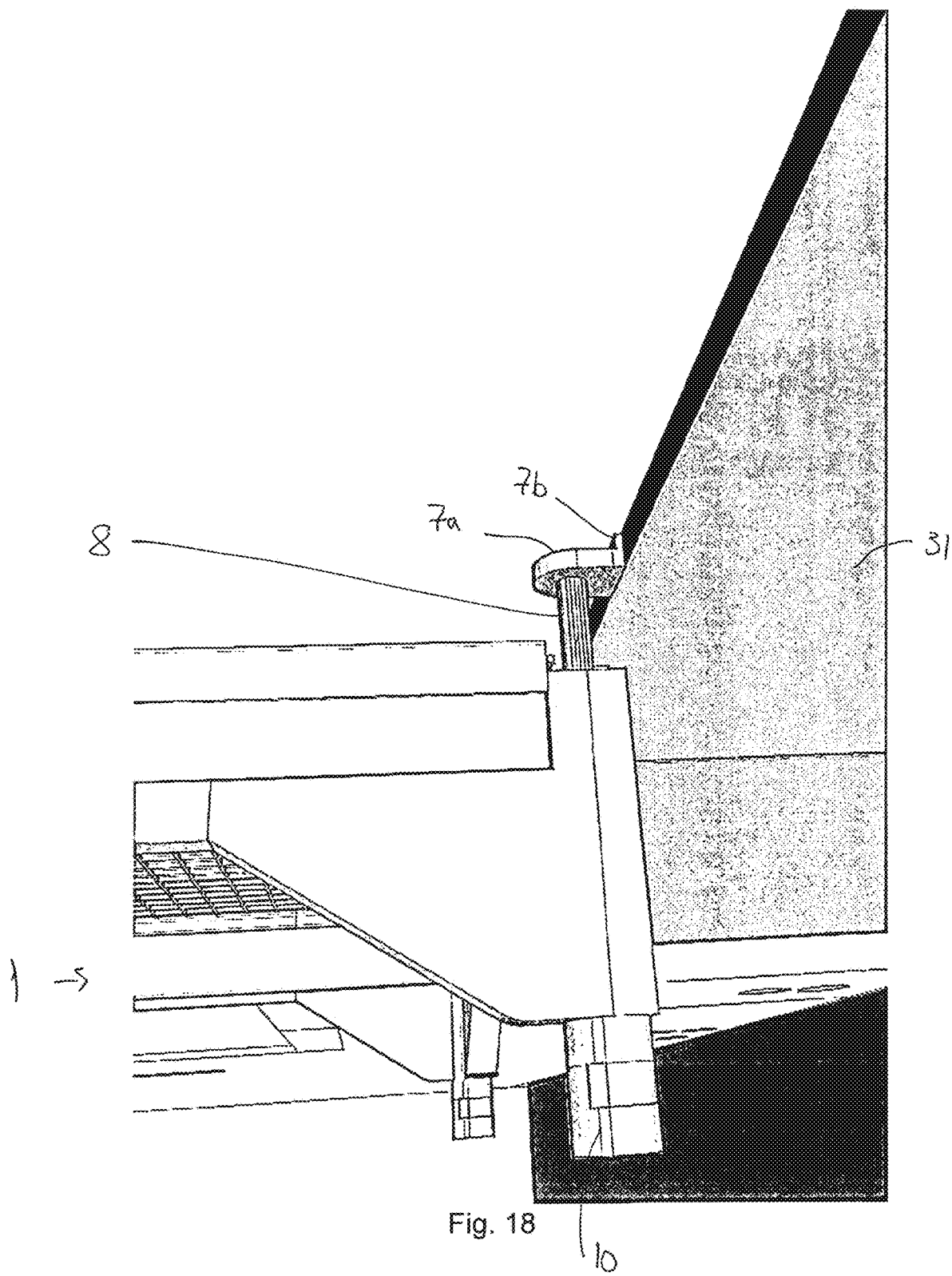
Figure 19:
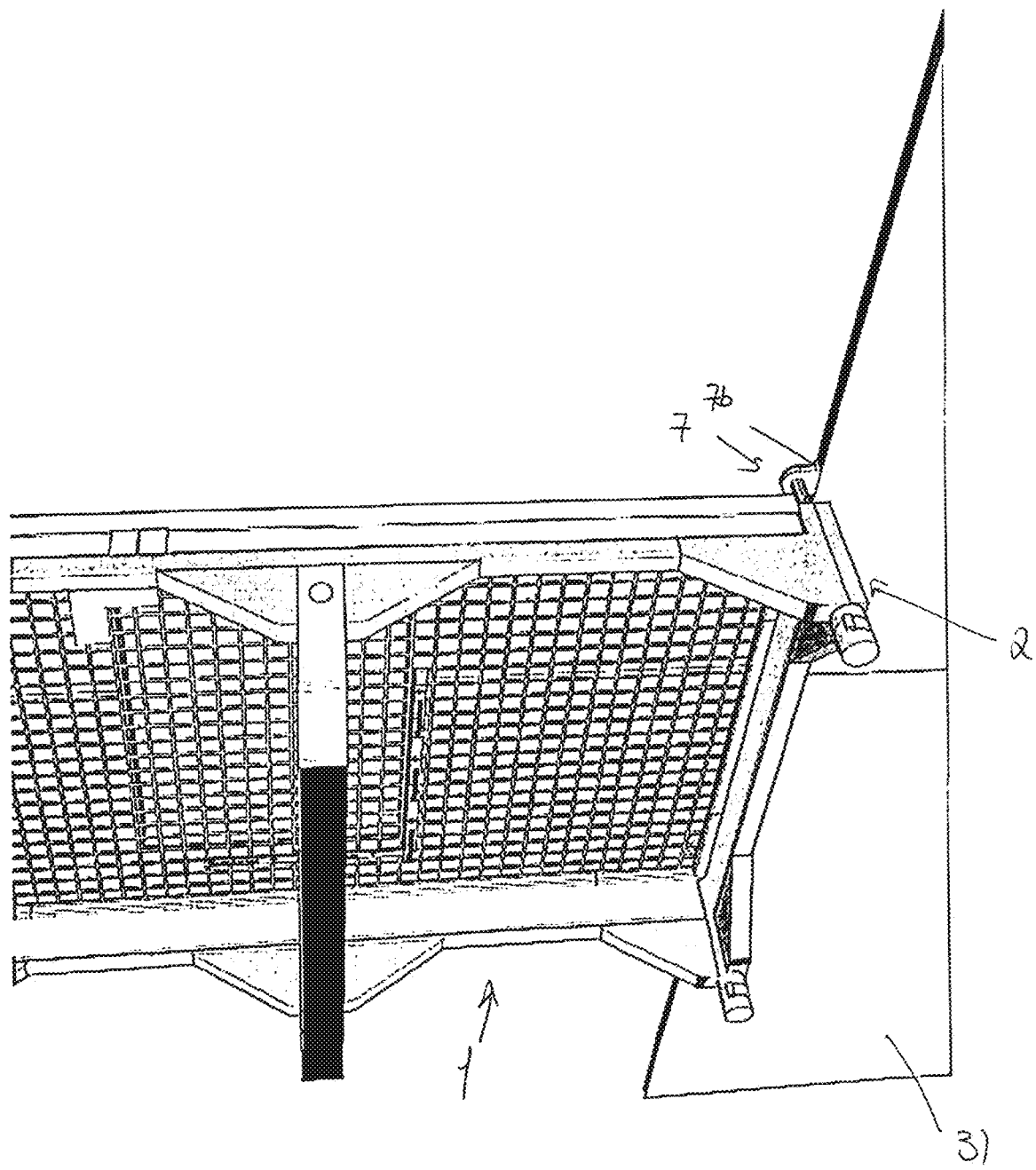

The marking grid could have different embodiments that could be realized in all embodiments of the frame, for example:

A net attached to the frame. The net has warp and weft threads with a surface upon which it is possible to make removable markings with a felt pen, stamp, ink spray or the likes (as shown in FIG. 14-15). A sheet with holes punched there through may also be used instead of a net with warp and weft threads. A net attached to the frame that is made of a magnetic fibre material, magnetic metal, magnetic threads, wires or their likes, or be covered by a magnetic paint. In this embodiment, templates that are magnetic may be used to mark positions (as seen for example in FIG. 9-10). In yet another embodiment the magnetic fibres, wires, or such may be coated with or encapsulated within a second material such as plastic or rubber (see FIG. 6-8). The second material may then aid the attachment of the templates on the surface of the net. In another embodiment, the second material is such that it aids the attachment of also non-magnetic templates on the net. Some examples for materials aiding the attachment of non-magnetic templates are, Velcro®, sticky materials such as removable glue, soft rubber or silicone, or a combination of different materials that can attach or stick to each other. In yet another embodiment, the second materiel is of such nature that it also allows the use of markings such as ink spray, pen, stamp and their likes. By said nature, it is meant that the surface of the second material is preferable light in colour such that marking made by a pen, stamp or such is easily visible, and that the surface is preferably glossy such that ink based markings may be easily removed without trace when needed.

A plurality of lasers emitter attached to the elements of the frame. The lasers emitters are arranged such that they emit laser beams preferably intersecting each other at a right angle such that the intersection of two laser beams marks a position of a measuring reference. In another embodiment, the laser beams may be of different colours to distinguish separate measuring references. In yet another embodiment, the frame also comprises a series or an array of sensors arranged along the periphery of the frame for detecting a position of a surface reference. The sensors are further functionally coupled to an electronic unit. In this embodiment, the user or tradesman may use a pointing device to mark the position of the surface reference. Said pointing device is further functionally connected to said electronic unit. The functional connection between the pointing device and the electronic unit may be a wired connection, or a wireless connection, or even an optical link, or any other communications medium. In one embodiment, when the user places the pointing device at a certain position located within the plane of width and height of the frame, and then presses a button on the pointing device, the array of sensors registers the position as pointed by the pointing device. The frame then projects the intersecting laser beams at said position to mark the position as registered by the sensors. The electronic unit also comprises a memory unit to save the registered positions. The electronic unit is also capable of registering a plurality of positions, and is able to project multiple laser beams to mark different positions of marked references on the same surface. The electronic unit is further capable of storing positions for different surfaces, for example as different file-names, with a capability to recall each of said different settings when needed. The user is also able to sort, edit, rename, or delete said settings for different surfaces. In yet another embodiment, the electronic unit is contained within the frame, also comprises a portable power unit such as a battery.

The embodiments of the grid 6 will be further explained below with specific examples.

The thread material should have at least some resistant to sharp objects to avoid accidental damaged. Nevertheless, the net should preferably be flexible enough to be rolled up if it is detached from the frame.

Instead of a net made up of weft and warp threads, it can also be made of a sheet material, such as a plastic sheet, with punched out holes in a raster pattern.

In an alternative embodiment, the net is made of a magnetic metal or made of any of the above-mentioned materials and also comprising a magnetic material, for example, coated with a magnetic paint. Such paints are readily available on the market. Alternatively, the net is made of a magnetic material such as iron wires, and said wires are coated with any of the above-mentioned materials.

All embodiments of the net ie grid structure or grid pattern as disclosed in the previous application 20160926 filed by the same applicant is possible embodiments of the grid 6 of the tool according to the invention.

Figure 11:
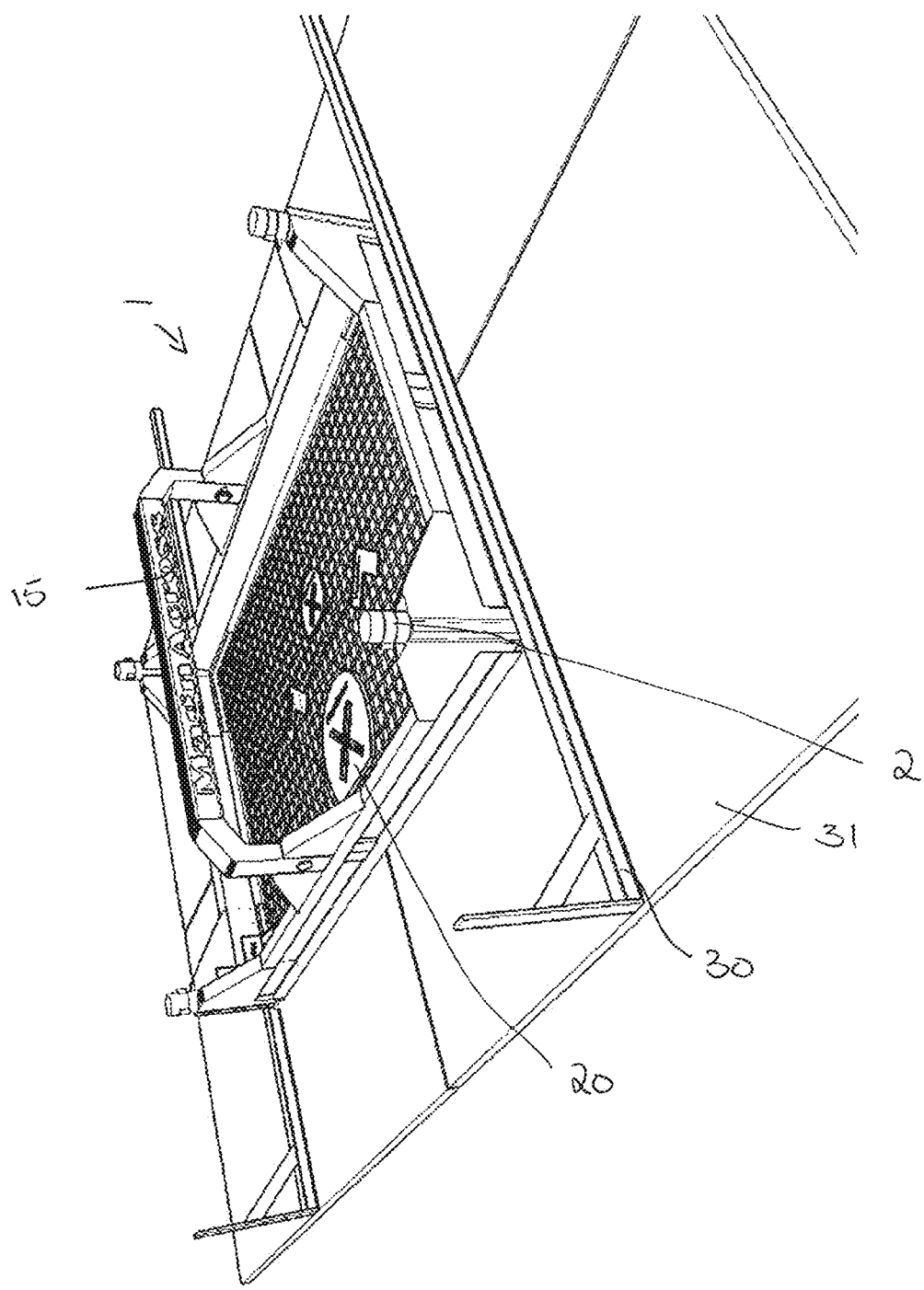
Figure 11A:
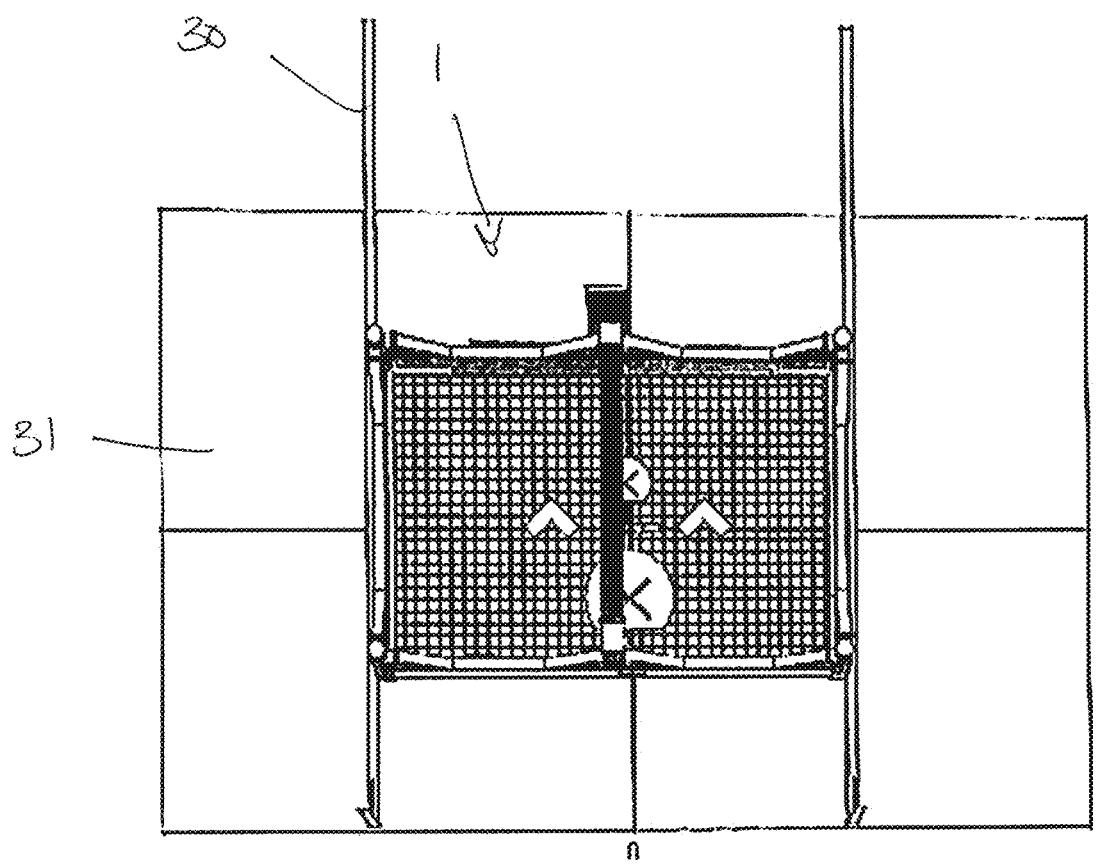
FIG. 11a-11d shows a process for measuring the cut-out with the tool, where
Figure 11B:
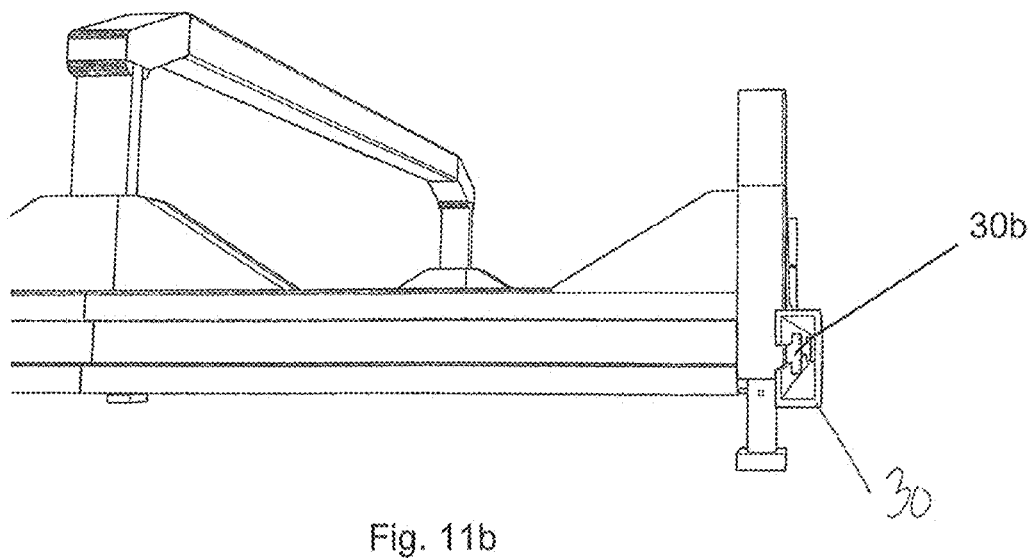
Figure 11C:
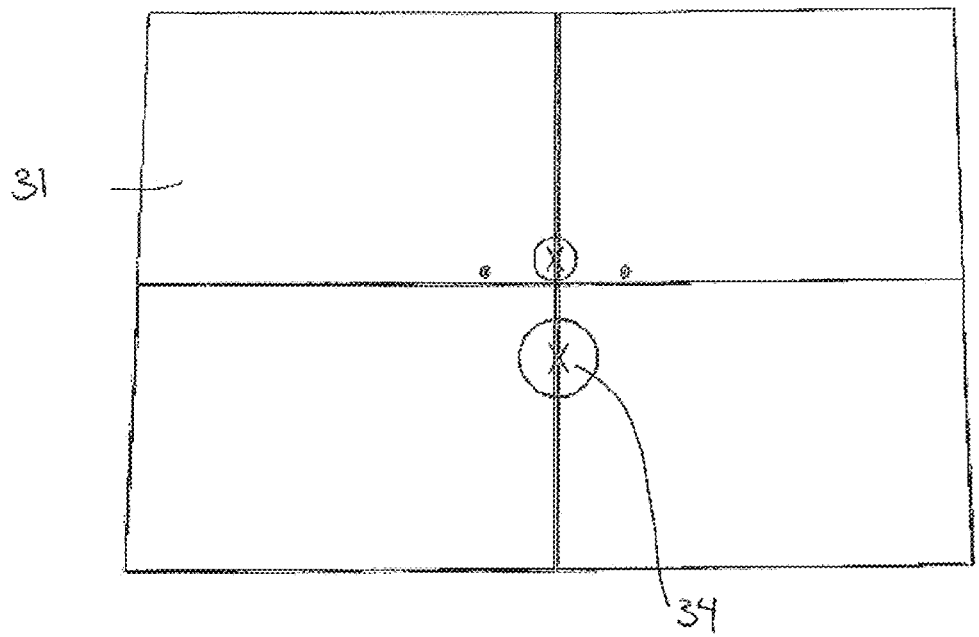
Figure 11D:
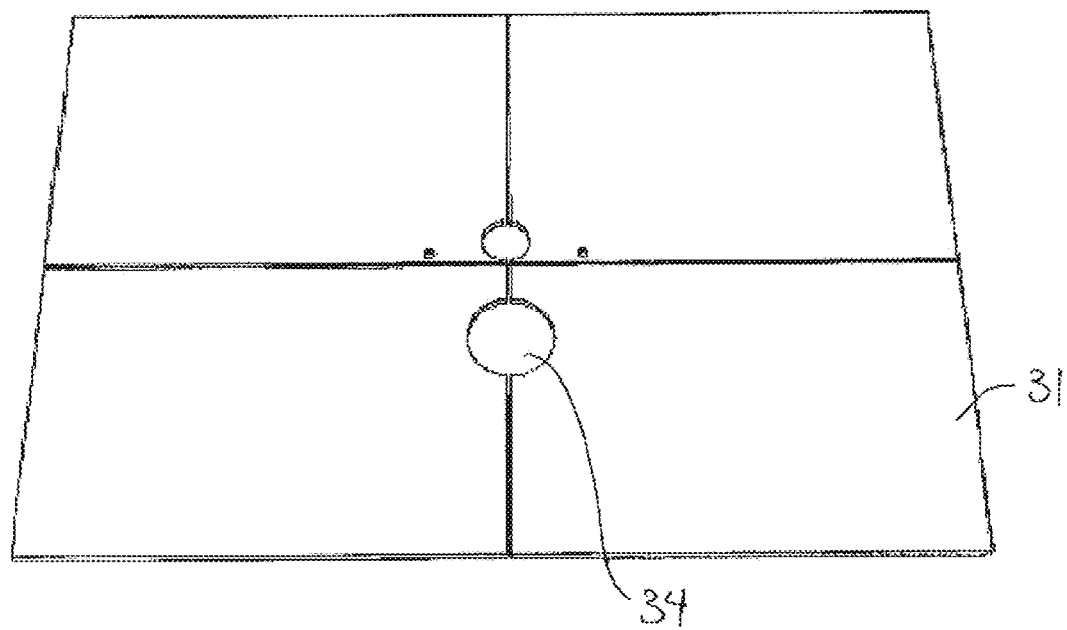
Figure 12:
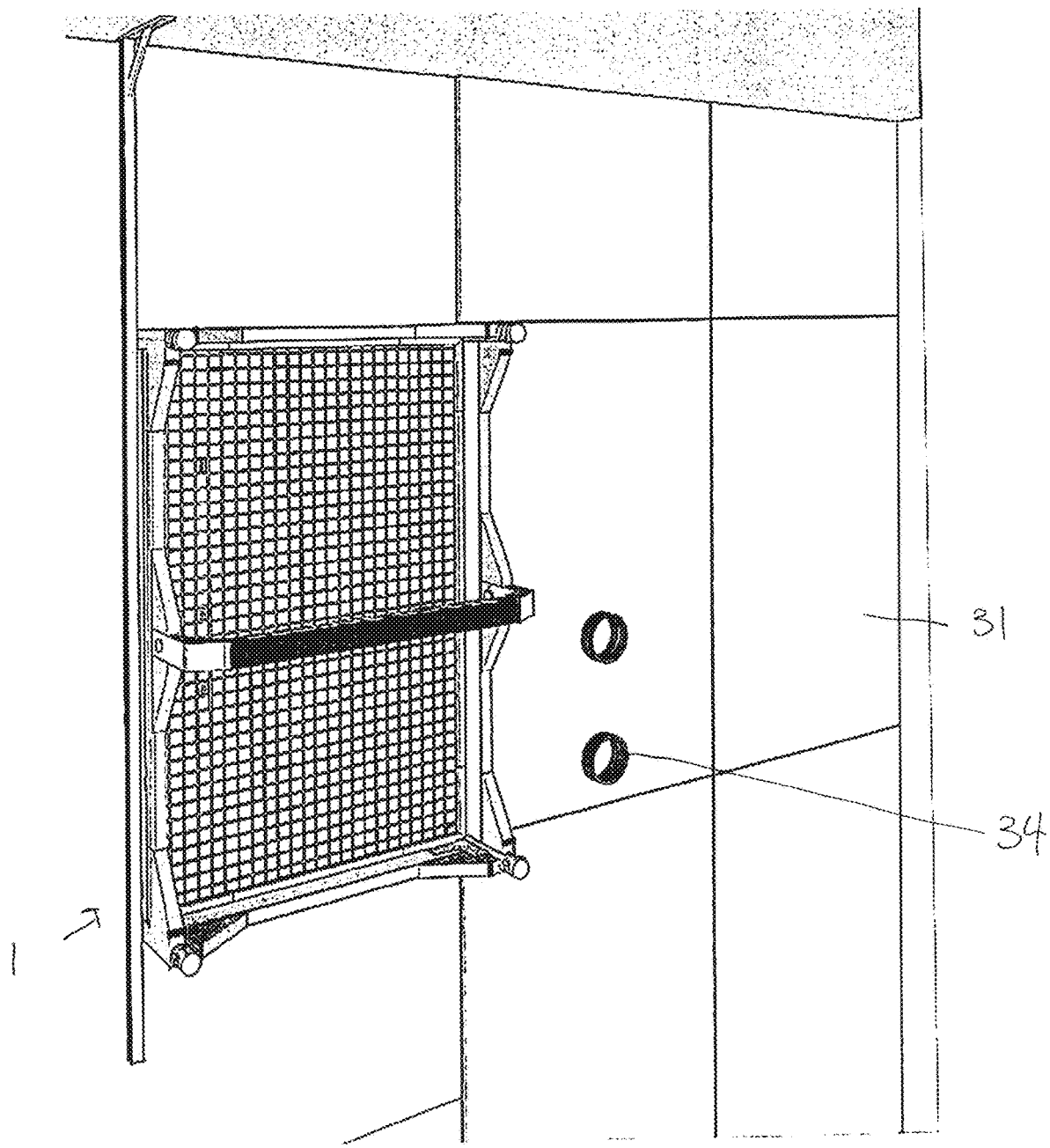
Figure 13:
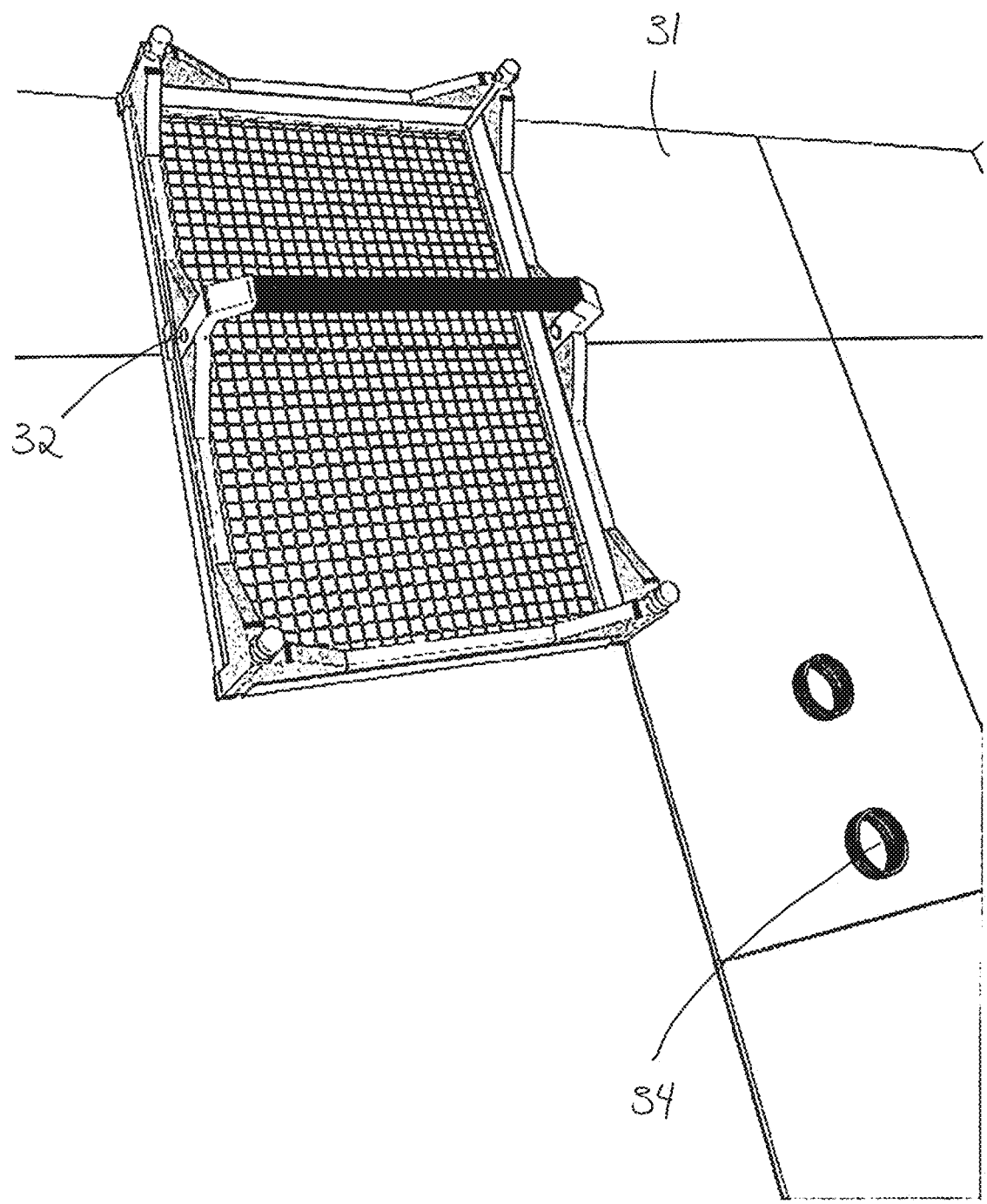

Furthermore, as shown in FIG. 11a-11b, outlets or measuring references that are to be cut out 34 in the tiles 31 are visible through the grid 6. For marking positions of references, or outlets, on the grid 6, templates 20 can be attached to the grid 6. The position of the tool 1 could be facilitated by bars 30 that are pulled out from the tool to a suitable distance from the measuring reference. FIG. 11b shows the bar 30 with brackets 30b.

The frame 3 could be made in one piece, for instance by casting. The material of the frame 3 could for instance be made aluminium or plastic. The frame 3 could be made of other materials and also be made of parts assembled together in one piece.

The mounting of the grid structure 6 to the frame 3 could also be performed in an easy manner. An angle hinge (not shown) could be mounted to the outer edge of the frame 3 so that the grid structure 6 is fastened between the frame 3 and the angle hinge (not shown). The grid structure 6 or net could be attached to the frame 3 in other ways also. The grid structure 6 can be attachable and detachable by hand from said frame like structure and rolled up as disclosed in the PCT/EP2017/063123 filed by the same applicant. The grid structure 6 could however be fixedly connected to the frame like structure. These being optionally feature of the invention.

The net or grid structure 6 could have warp and weft threads with a surface upon which it is possible to make removable markings with a felt pen, stamp, ink spray or the likes as described above.

The net or grid structure 6 has warp and weft threads extending in right angles to each other. The spacing between the threads may vary, but could preferably be in the order of 1-10 mm, most conveniently 5-10 mm. The thickness of the threads should be in the order of 0.3-1 mm. This provides an optimal sizing with respect to both putting markings on the threads and transferring the markings to the board, as will be described in detail below. However other spacings and thickness are also possible.

The net or grid structure 6 can be made of a variety of materials, such as metal wire, plastic, Kevlar®, carbon fibre, glass fibre and natural fibres. The threads should preferably have a smooth surface. The threads may be covered with a coating, such as paint or plastic, e.g. polyurethane. When using a pen, ink stamp or similar devices for marking the surface of the net, the colour should be bright enough so that such markings are visible, but dark enough so that wiped out markings remaining do not stand out and easily are mistaken for valid markings. It has been found that a grey colour is suitable. More generally, the colour of the thread surface should have good contrast with respect to the ink of the pen or other such instrument, which is being used to make the markings. Also, the thread surface should be such that the ink or other marking medium may be removed without leaving visible traces when needed.

The thread material should have at least some resistant to sharp objects to avoid accidental damaged. Nevertheless, the net or grid structure should preferably be flexible enough to be rolled up if it is detached from the frame 3.

In an alternative embodiment, the net or grid structure 6 is made of a magnetic metal or made of any of the above-mentioned materials and also comprising a magnetic material, for example, coated with a magnetic paint. Such paints are readily available on the market. Alternatively, the net or grid structure is made of a magnetic material such as iron wires, and said wires are coated with any of the above-mentioned materials. The functioning of a magnetic net will be explained below.

A net or grid structure 6 attached to the frame could also be made of a magnetic fibre material, magnetic metal, magnetic threads, wires or their likes, or be covered by a magnetic paint. In this embodiment, templates 20, 21 that are magnetic may be used to mark positions. In yet another embodiment the magnetic fibres, wires, or such may be coated with or encapsulated within a second material such as plastic or rubber. The second material may then aid the attachment of the templates on the surface of the net. In another embodiment, the second material is such that it aids the attachment of also non-magnetic templates 20, 21 on the net. Some examples for materials aiding the attachment of non-magnetic templates are, Velcro®, sticky materials such as removable glue, soft rubber or silicone, or a combination of different materials that can attach or stick to each other. In yet another embodiment, the second materiel is of such nature that it also allows the use of markings such as ink spray, pen, stamp and their likes. By said nature, it is meant that the surface of the second material is preferable light in colour such that marking made by a pen, stamp or such is easily visible, and the surface is preferably glossy such that ink based markings may be easily removed without trace when needed.

A sheet with holes punched there through may also be used instead of a net with warp and weft threads. The sheet could for instance be a plastic sheet with punched out holes in a raster pattern.

The tool further comprises a leg arrangement 2. The leg arrangement being an extension element. In the FIG. 1-3 the leg arrangement or extensions elements 2 are shown as legs 2 arranged at each of the corners of the frame 2. The leg arrangement 2 can be used for adjusting the height of the proposed tool 1. The leg arrangement is also suitable for adjusting the tool between two adjacent tiles or rest against a mounted tile or end construction element to position the tool. In this way the correct cut out position is transferred from the wall or construction element to the tile or tiles. This could be performed with help from bars 30 that could be attached to the tool 1. This is further disclosed below.

Figure 4:
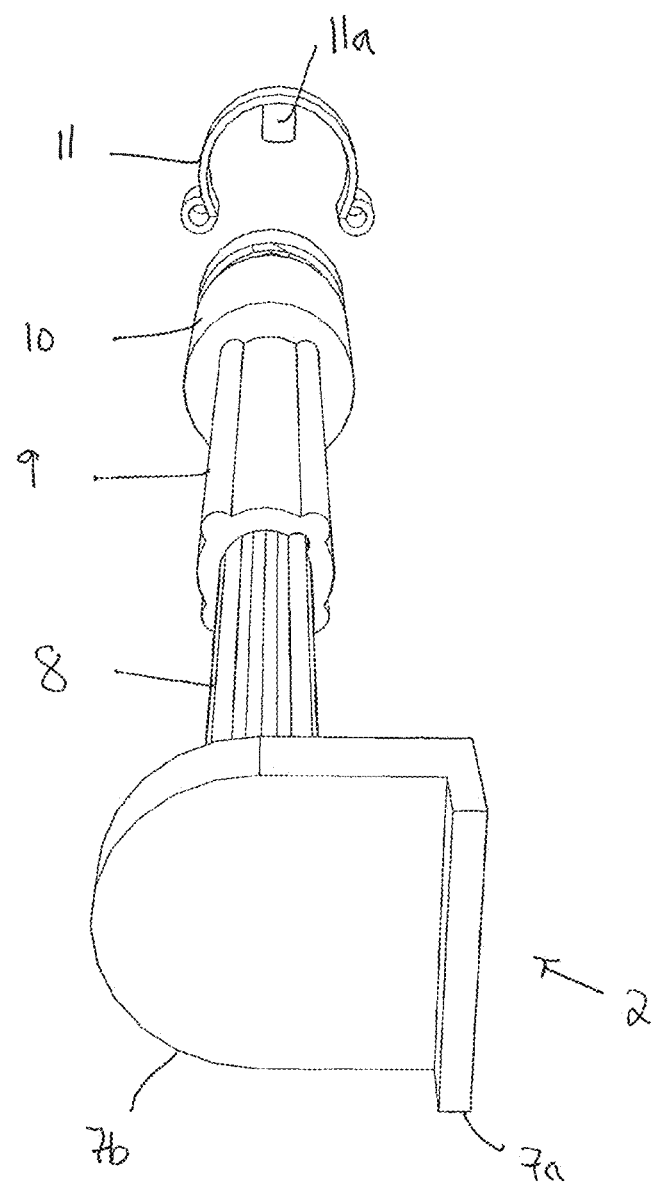
FIG. 4 shows one embodiment of the leg arrangement assembled without the measuring part of the tool.
Figure 5:
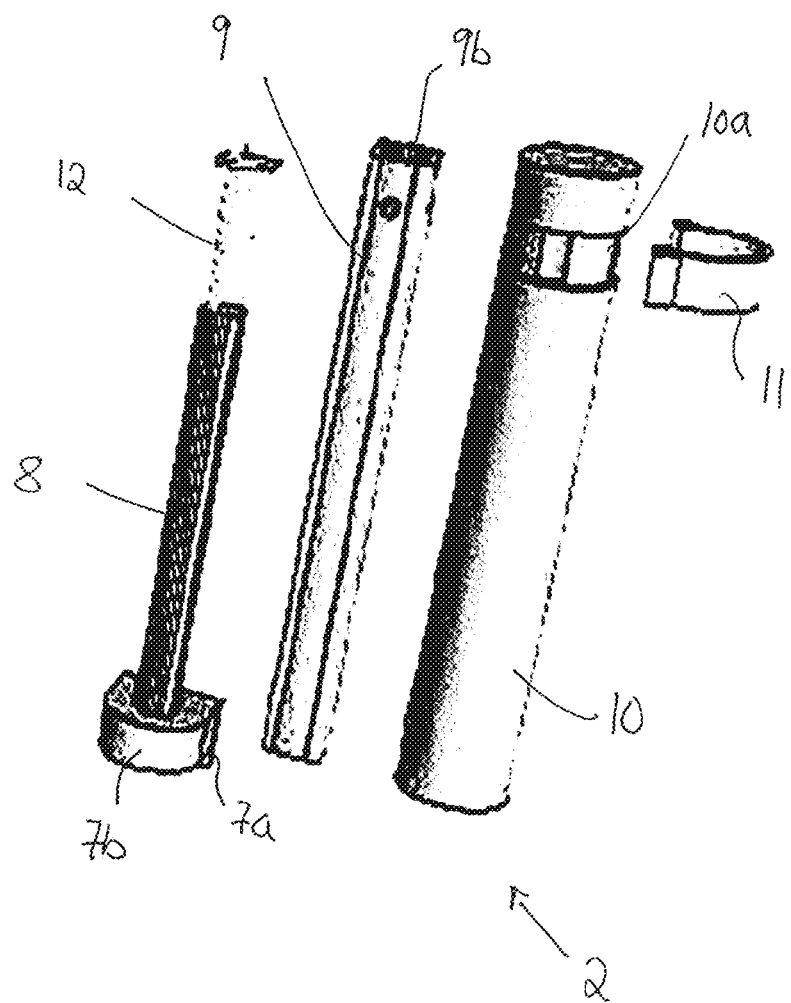
FIG. 5 shows the leg arrangement from FIG. 4 viewed as individual components.

On embodiment of the leg arrangement 2 is disclosed in detail in FIGS. 4 and 5. The FIG. 4 shows the leg arrangement assembled together. The FIG. 5 shows the leg arrangement 2 in individual parts. Each leg arrangement 2 comprises a first leg part 8 and a second leg part 9, said first leg part 8 is slidably arranged within the second leg 9. The first leg part 8 having a spring 12 connected to the end of the first leg part 8 that is arranged within the second leg part 9. The spring 12 is attached to the second leg part 9.

Figure 3A:
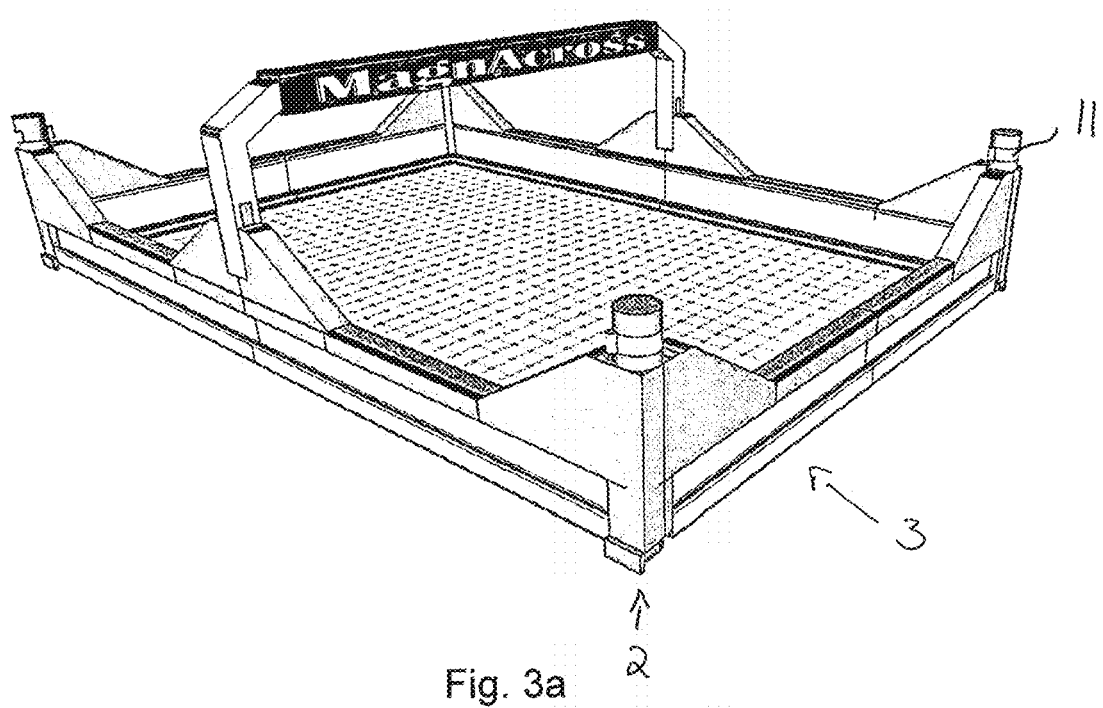
FIG. 3a shows a perspective view of a measuring part of the tool according to an embodiment of the invention with the leg arrangement pulled inside the tool.
Figure 3B:
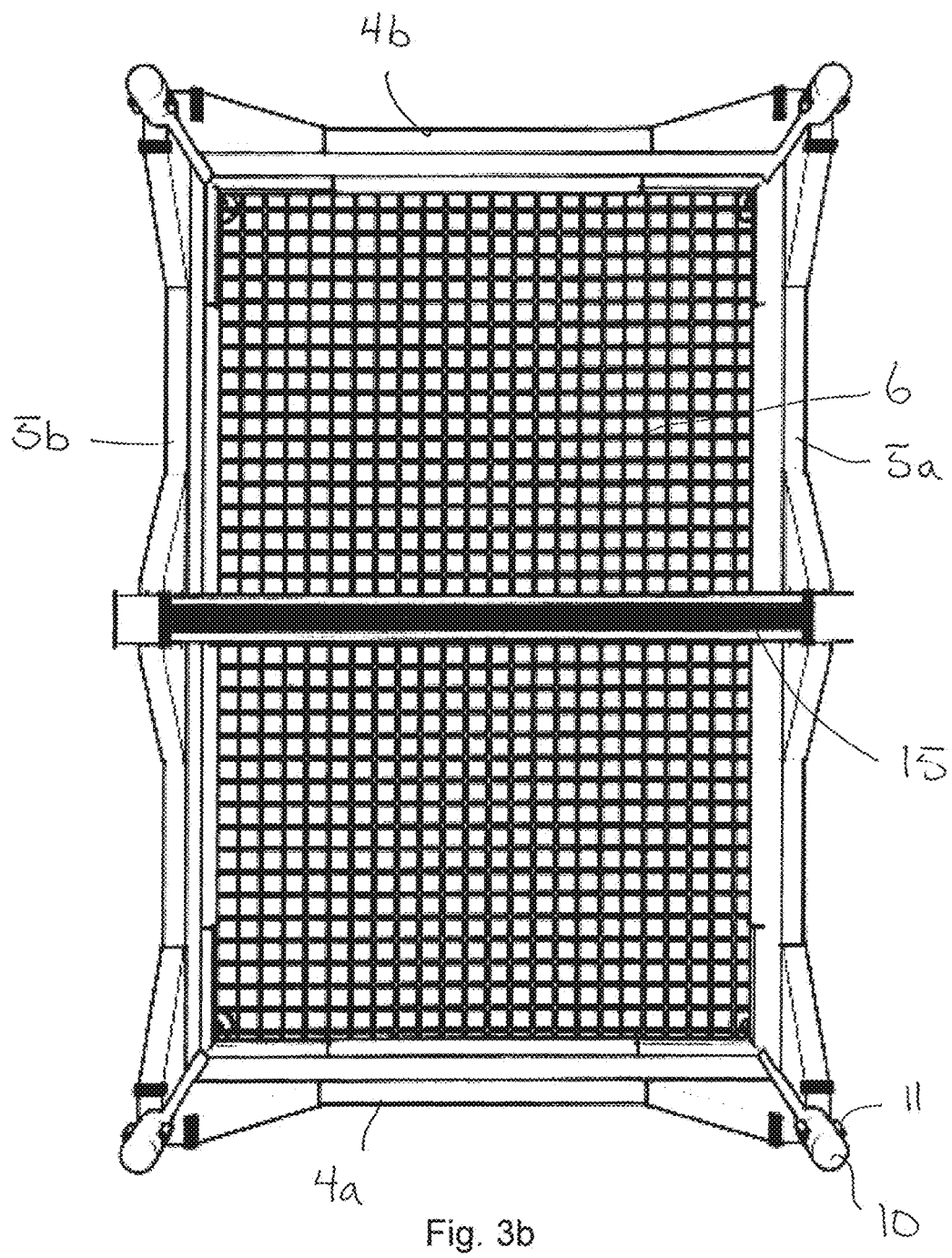
FIG. 3b shows the tool viewed from above.
Figure 3C:
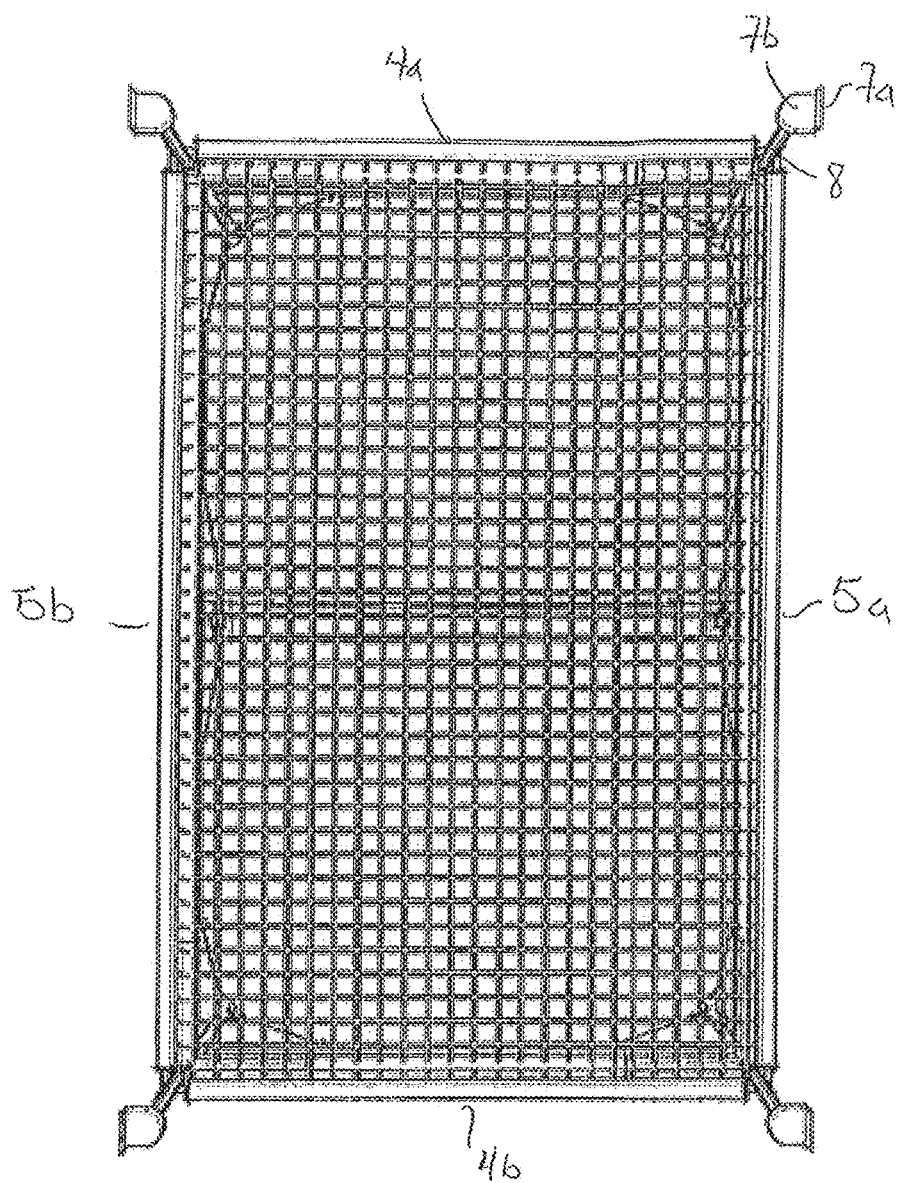
FIG. 3c shows the tool viewed from below.

The spring 12 makes it possible for the first leg part 8 to move within the second leg part 9. The first leg part 8 could have several positions in the second leg part 9. The first leg part 8 could be fully retracted in the second leg part 9 as shown in FIG. 3 and FIG. 8. This is called a retracted position. When the tool 1 is arranged on a substantially planar surface, and the frame 3 is pushed towards the planar surface so that the transfer of the placement of the cut-outs become easier to perform. The spring 8 is tensioned inside the second leg part 9 in this position.

The second positioning of the first leg part 8 is where the first leg part 8 is fully extended. In this position the first leg part 8 is protruding out from the second leg part 9 to an end point. In this position, there is minimal tensioning of the spring 12.

The first leg part 8 have this position when the tool is not in use or the tool is lifted away from the transfer surface.

The first leg part 8 could have positioning in a range between these end positions.

The individual first leg part 8 arranged at the four corners of the frame 3 could move independently of each other so that they could have different positions in second leg part 9. This is for instance advantageous when the surface to be measured is not planar. In this situation the frame 3 could be lowered down the foundation/tile/construction element to be measured as far as possible. The individual first leg parts 8 are retracted as far as possible until a steady position as near the foundation/construction element/tile as possible. This makes the measuring and transferring of the positions to be cut-out more easy and exact.

The opposite side of the first leg part 8 that is extending from the second leg part 9. At this side, there are arranged an end portion 7 having a support element 7b and a spacer element 7a. Said spacer element 7a protruding from the support element 7b away from the tool 1 as shown in the figures. The spacer element 7a has a thickness substantially equal to the normal desired spacing between two tiles 31 that are mounted adjacent. The support element has a substantially planar surface adapted to rest on the surface of the foundation or construction element or tile 31.

This facilitates that the arrangement of the tool 1 being positioned at the exact position of the tiles 31 to be mounted.

The tool 1 do not require any other further positioning requirement for transferring positioning of measuring references from a construction frame or element. To compensate for different space or joint spacing between the two adjacent tiles, the end portion 7 or the spacer element 7a could be replaced with profiles having different width. The end portion 7 could for instance have a removeable spacer element 7a. This would result in that the spacer element could be replaced by another spacer element 7a having a different size.

Another embodiment is that the end portion 7 or the whole first leg part 8 could be replaced to obtain the different width of the spacer element 7a.

The second leg part 9 is arranged within an outer sleeve 10. The outer sleeve 10 is connected to the frame 3. In FIG. 1 the outer sleeve 10 is arranged in a cylindrical hollow part of the frame 3. There is arranged one leg arrangement 2 in each of the corners of the frame 3 as previously disclosed.

The outer cylinder 10 having a groove 10a arranged at the top part of the sleeve 9. An U-shaped clamp 11 is adapted to surround a portion of the outer sleeve 10. The clamp 11 has the same dimensions as the groove 10a and is adapted to mate with the groove 10a. The clamp 11 having also a protrusion 11a (shown in FIG. 4). This protrusion 11a is adapted to be received in an opening 9b in the second leg part 9 when the second leg part 9 and the outer sleeve 10 are connected. This will attach the second leg part 9 and the outer sleeve 10 together. It will also prevent that the second leg part 9 and the outer sleeve 10 are moved in relation to each other in the longitudinal direction. The clamp 11 can also be seen on FIG. 1-3 at the opposite end of the extension arrangement 2 than the end portion 7.

The end portion 7 is adapted to revolve in the plane parallel to the grid structure 6 of the tool 1, such that the spacer element 7a can have different positions in relation to the frame 3. The spacer element 7a could for instance be arranged parallel with any of the side of the frame as shown in the figures. This increases the positions in which the spacer element 7a can be used. As measuring reference.

Another embodiment of the invention is to have a leg arrangement that could be adjusted or aligned in case of uneven tiles. This spacer element could for instance be a replacement profile that could replace the whole leg arrangement or only the end portion 7. The principle function of this embodiment is that the leg arrangement or end portion is adapted to move along a plane that is parallel with a plane extending through the surface of the grid structure 6.

This could be done by arranging a rail (not shown) on the corners of the frame 3 and slidably attaching the leg arrangement 2 within this rail. The leg arrangement 2 could move in a plane parallel with the surface of the grid or pattern 6 to align with the design of the tile or construction element to be measured. Each leg arrangement 2 in each corner could have similar rails so that each leg arrangements 2 are independently adjustable with the tiles or construction.

Figure 21A:
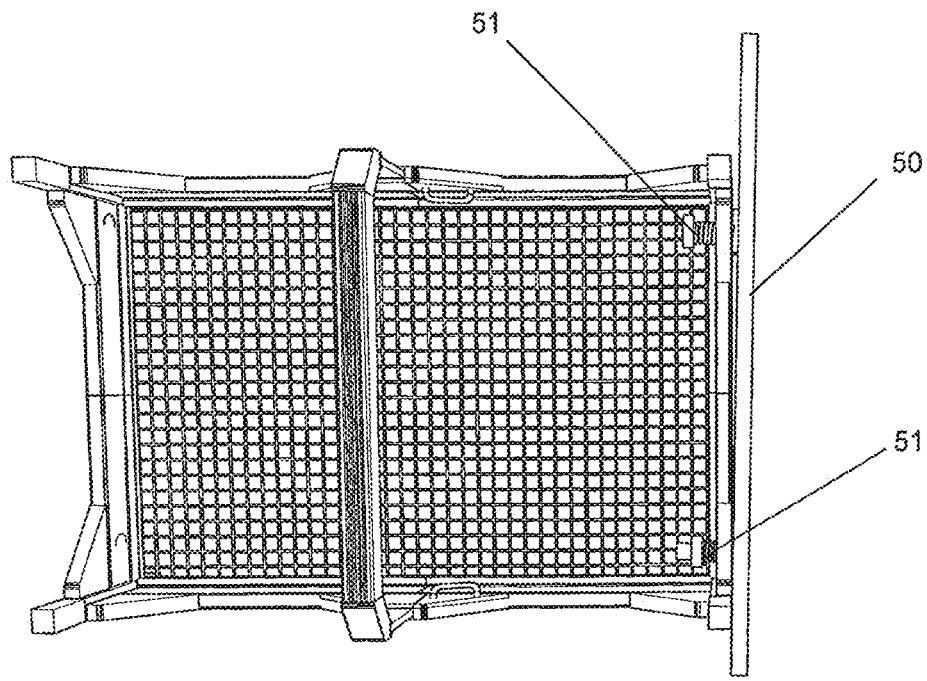
FIGS. 21a-21b show an embodiment of the tool with alignment part and its attachment screws.
Figure 21B:
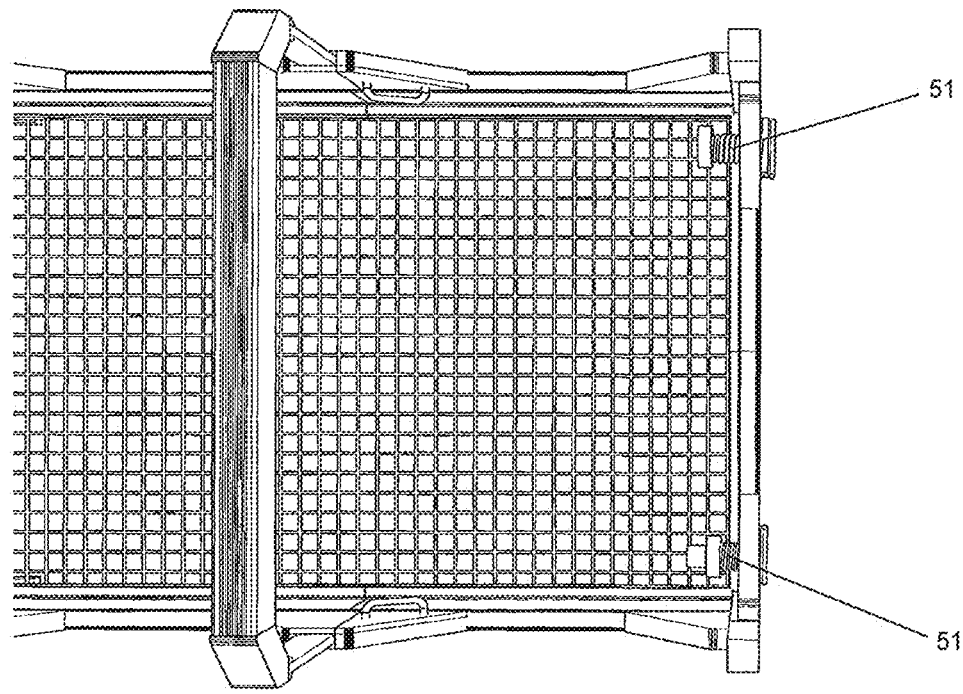

Another possible embodiment for compensate for uneven tiles are shown in FIGS. 21a and 21b. The tool 1 is positioned against the uneven tile. An alignment part 50 is attached to the side part of the frame as shown in the figure. FIGS. 21a and 21b show the alignment part 50 and its attachment screws in detail. The alignment part 50 could be adjusted by screws or other adjustment means 51 so that the alignment rests against the tile while the tool 1 is correctly positioned. The screws may be equipped with springs to pull the alignment bar towards the frame. The alignment part 50 could then be inclined relative to the tool to compensate for the uneven tile. This alignment part 50 could also compensate for uneven construction elements.

The leg arrangements disclosed above discloses only an embodiment of the invention. Other leg arrangement is also possible.

Another embodiment could for instance be a leg arrangement made of one part that, such as the first leg part 8 with the end portion having the spacer element 7a. This embodiment of the leg arrangement could for instance be attached to the frame 3 by for instance, internal screw-thread. In this embodiment the leg arrangement could be detached completely from the frame and the distance between the spacer element 7b and the frame 3 could be adjusted by manually rotated the leg arrangement.

Other attachments could be snap coupling, with or without a springbolt to facilitate the positioning of the leg arrangement in the frame 3.

The placement of the leg arrangement or arrangements on the frame 3 could also be different, for instance there could be only one leg arrangement arranged one side of the frame, two or more leg arrangements arranged on various positions on the frame. It is also possible to arrange the leg arrangements remote from the corners.

All the possible arrangements of the leg arrangement could have arrangements with rails for adjusting the position of the leg arrangement according along a plane parallel with the surface of the grid of pattern. All of the possible leg arrangements described could also have replaceable profiles for different width between two adjacent tiles or construction elements.

There could also be a leg arrangement where only the end portion 7 protruding from the tool 1.

The tool 1 could also have a handle 15. The handle 15 is arranged on the opposite side of the leg arrangement 2. The handle 15 facilities the operation of the tool. The handle 15 will make it easier to lift the tool 1 and also hold the tool 1 at the right position when measuring the cut out position 34 by using only one hand. One person is thus able to use the tool. The handle 15 could be pivotably connected to the frame so that the handle 15 can be moved to a resting position where the top handle 15b is resting on two opposite sides 5a, 5b of the frame 3. The handle 15 is attached to the middle of the longitudinal sides 5a, 5b of the frame 3 but other arrangement of the handle 15 is possible embodiments of the invention. The handle 15 could also be releasable mounted to the tool.

Figure 20A:
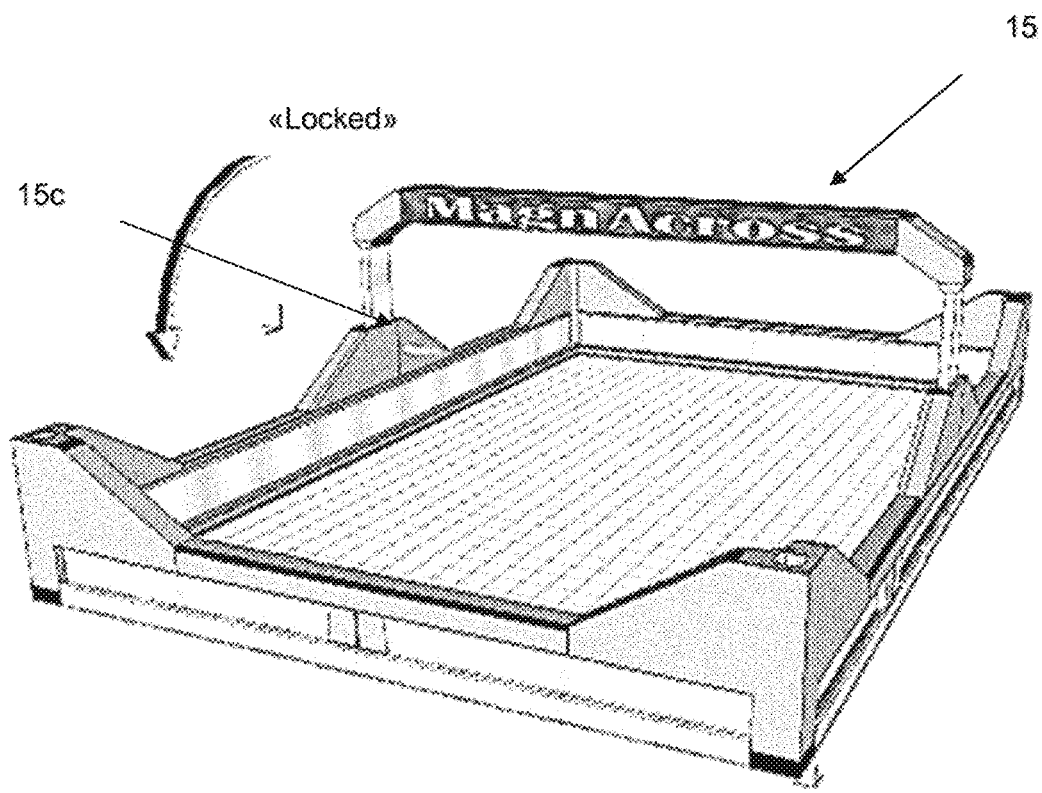
FIG. 20a-20h shows another embodiment of the invention where the handle is arranged pivotably.
Figure 20B:
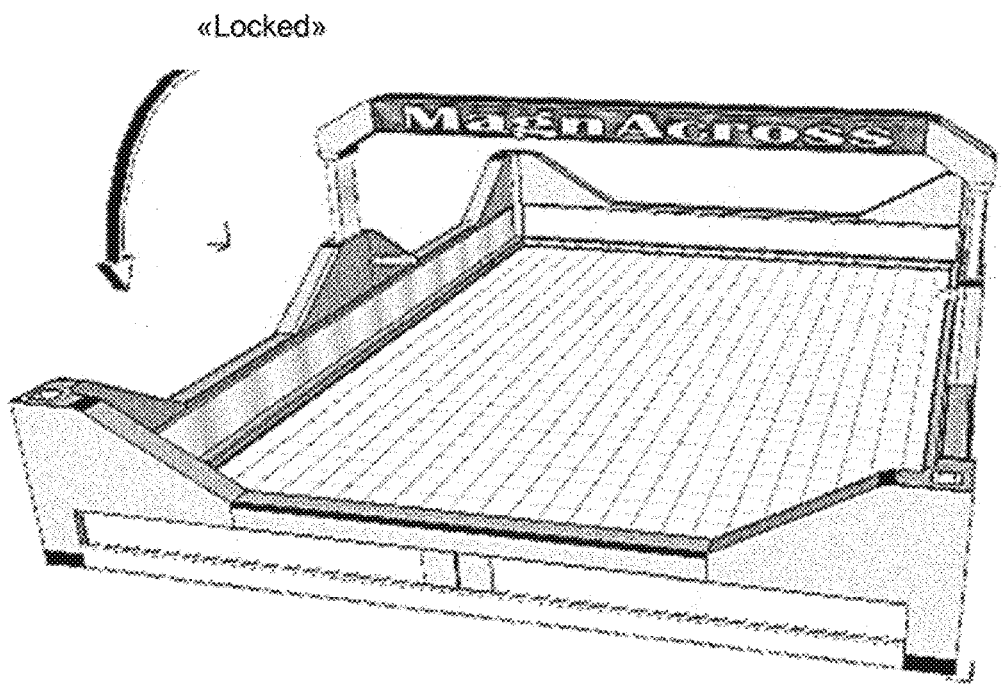

The FIG. 20a-20h shows the tool with handle 15 with different positions and embodiments. The handle 15 could be positioned by snap coupling in different position, either a resting position as shown on FIG. 20c-d or an upstanding position as shown in FIG. 20a-b. There could also be arranged a handle bar 15b that releases the snap coupling so that the handle 15 could be moved.

Figure 20C:
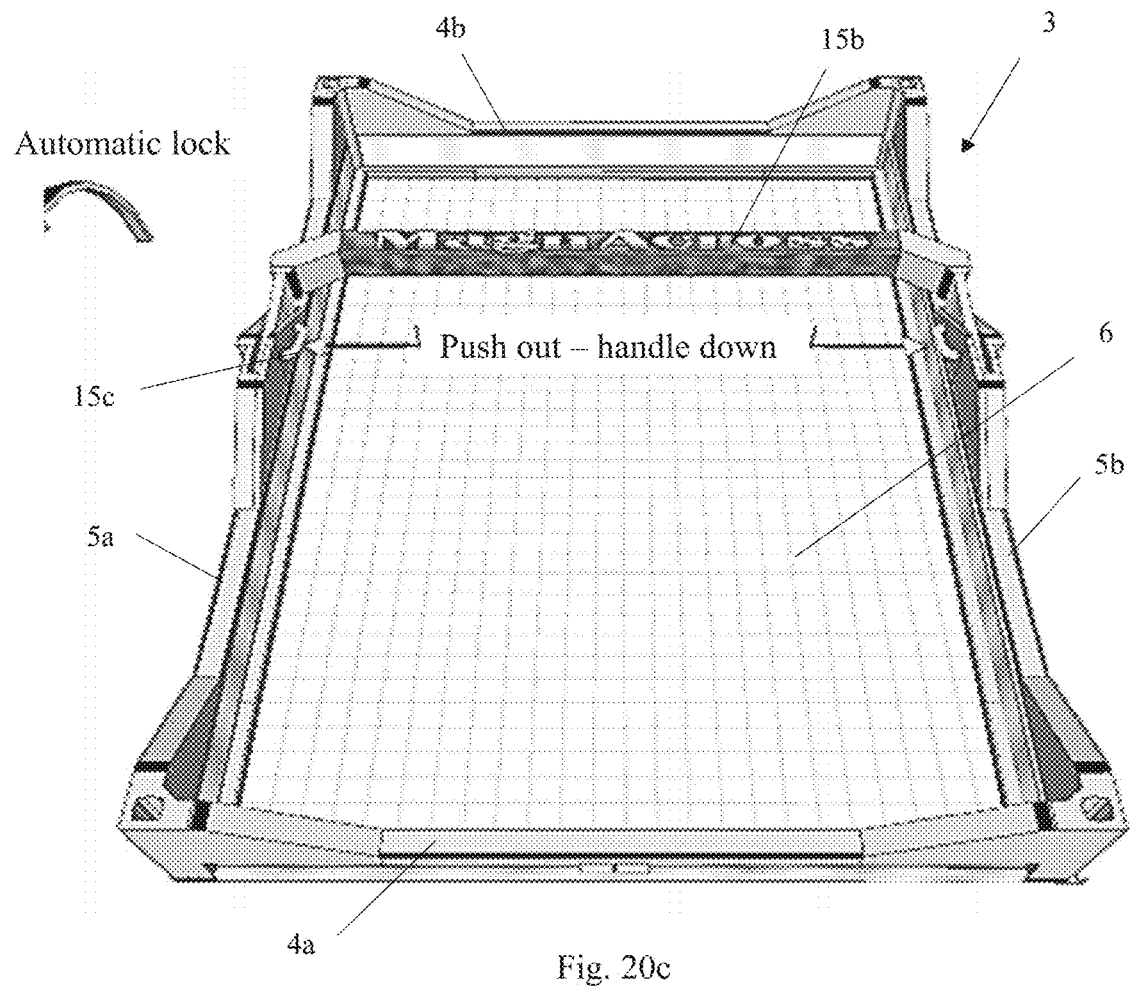
Figure 20D:
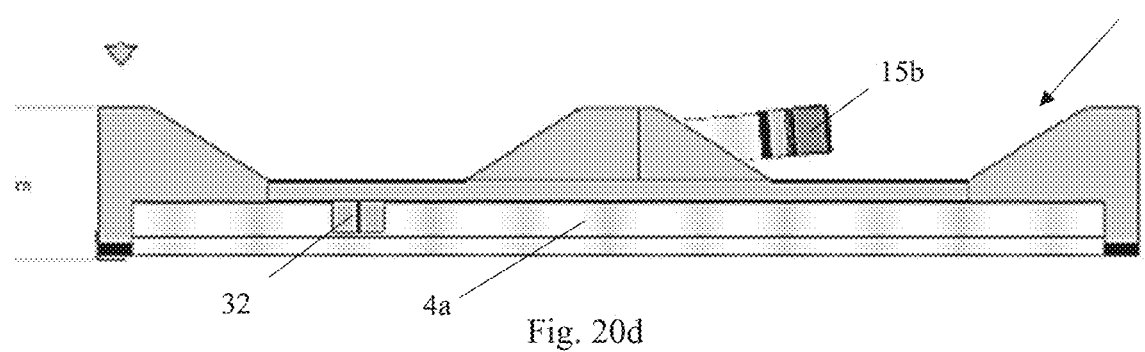
Figure 20E:
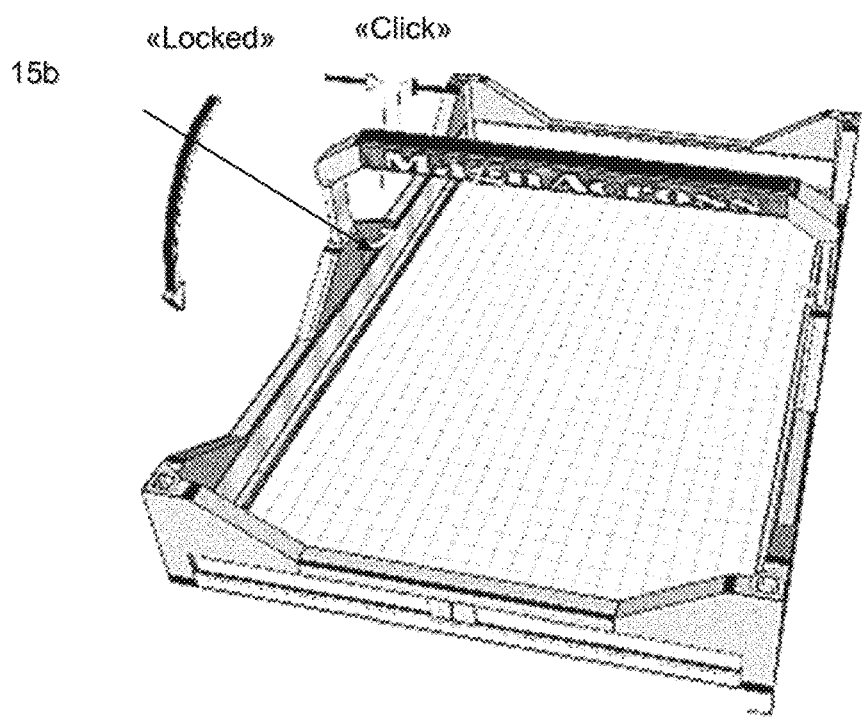
Figure 20F:
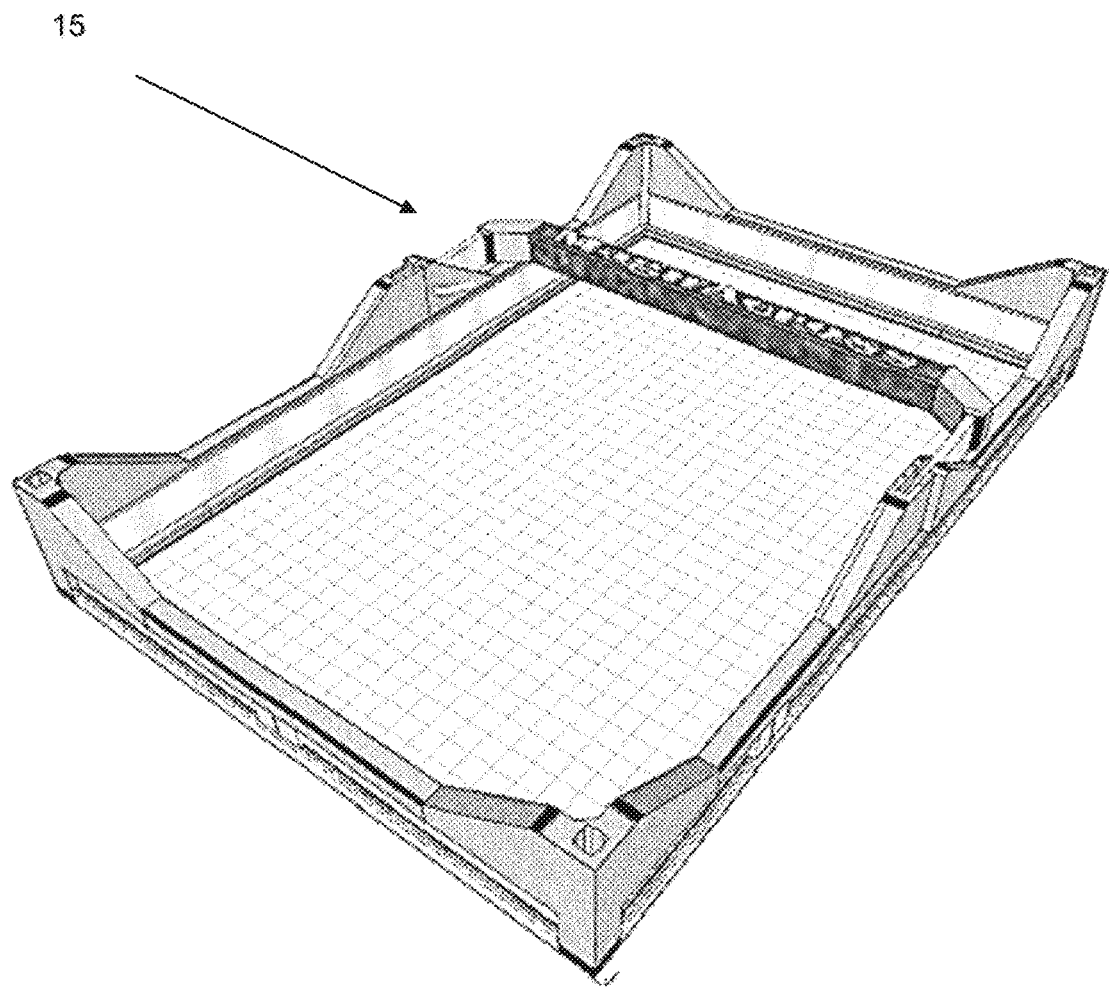
Figure 20G:
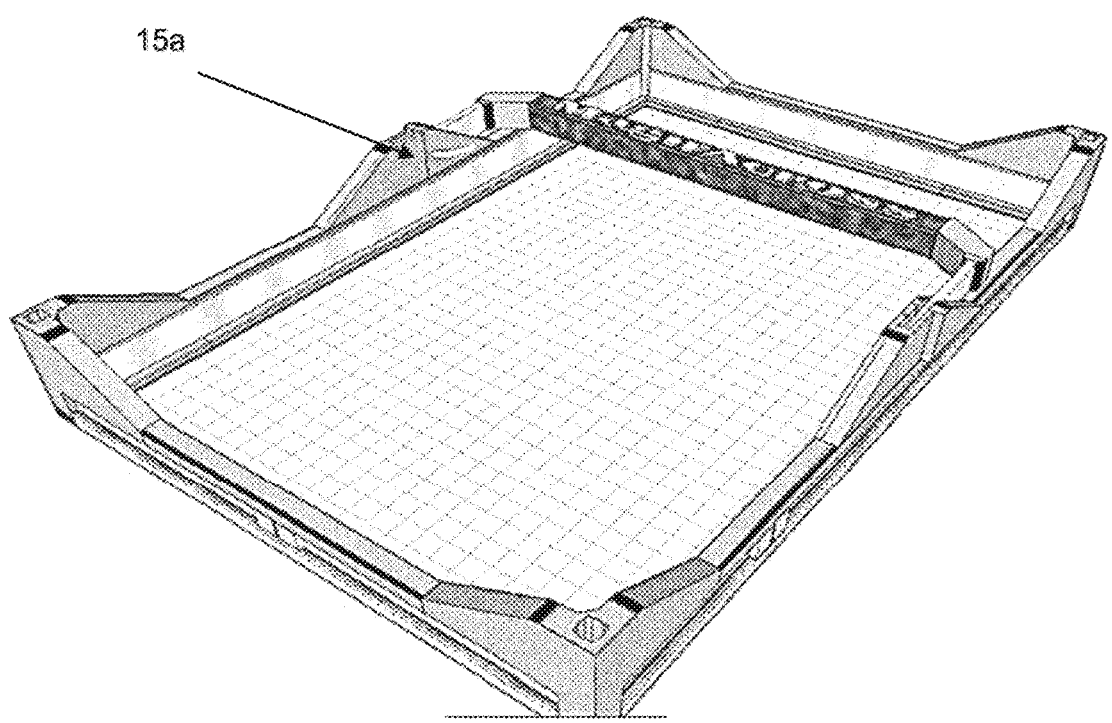
Figure 20H:
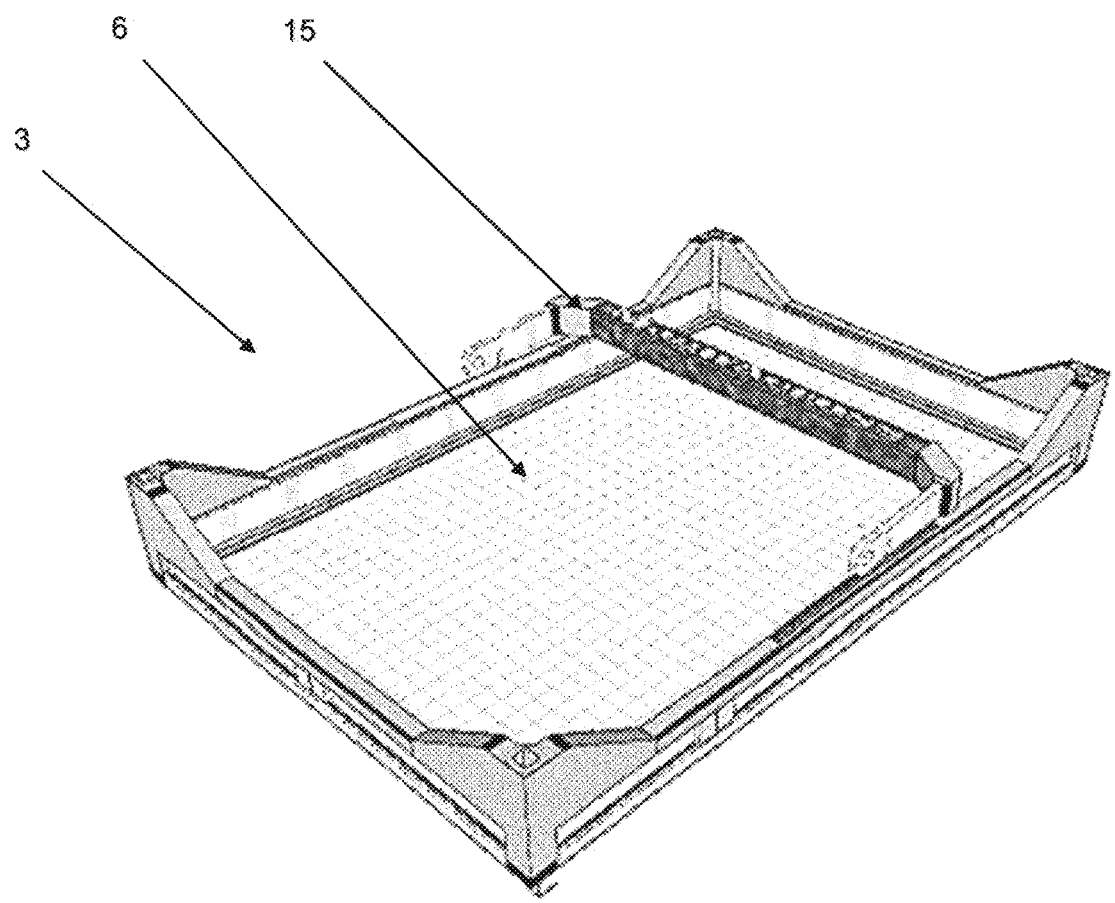

FIG. 20a-g shows that the handle 15 move in one direction within a slot in the pivotable connection 15b, while the FIG. 20h shows a hinge connection between the handle 15 and the frame 3 where the handle is adapted to move to both sides.

The FIG. 20c further discloses the tool 1 with the leg arrangement 2 removed.

Figure 10:
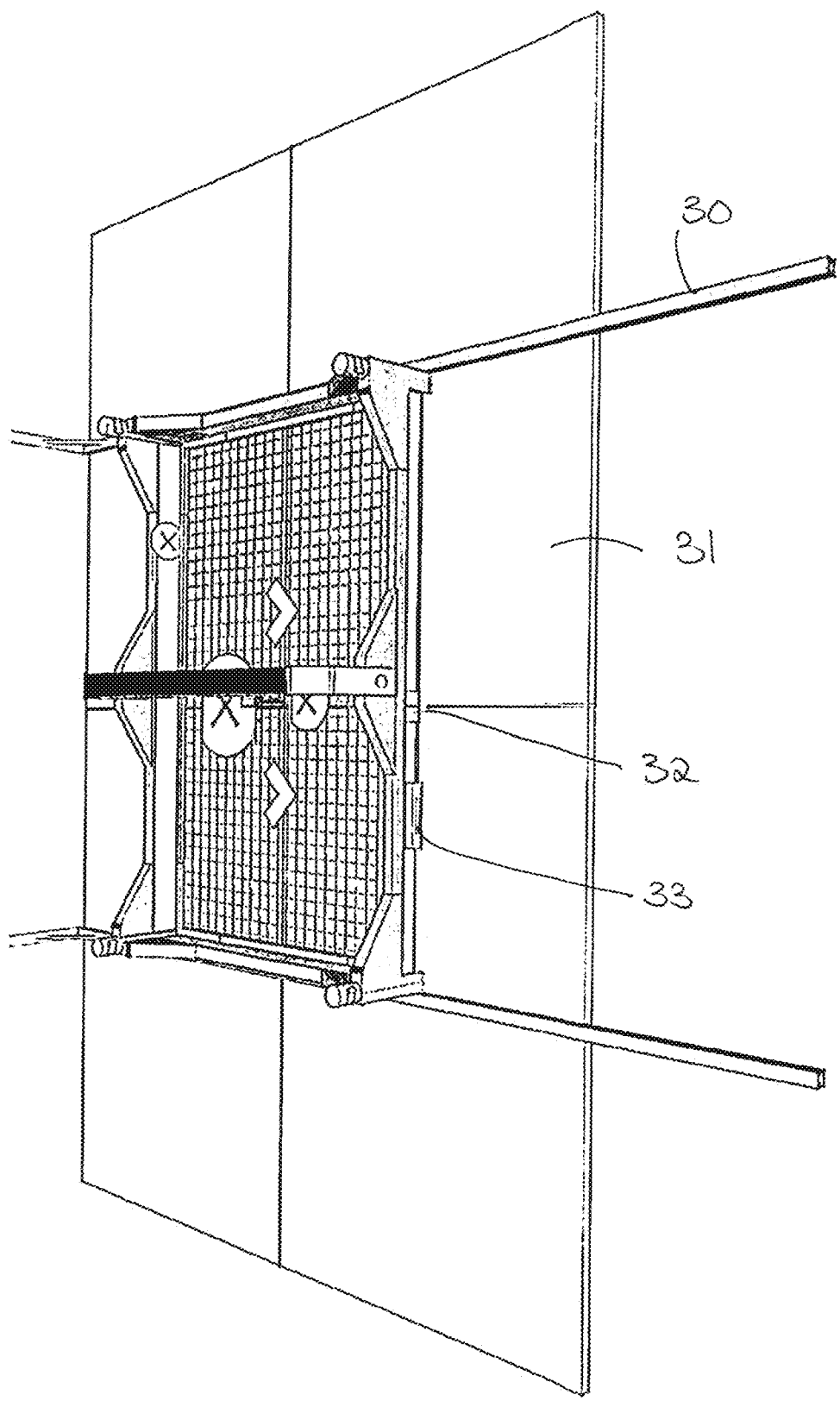

In addition, the tool 1 could have positioning devices 32 attached at each of the sides of the frame. There could be for instance a pair of positioning devices 32 arranged at opposite side the frame elements (4a, 4b, 5a, 5b). These positioning devices 31 are slidably attached to the side of the frame 3 to markup different positions, like the position between two adjacent tiles 31 as shown in FIG. 10-11. There could also be more than one positioning device at each side as shown in FIG. 2.

A bar or bars 30 could also be attached to the tool to facilitate the positioning of the tool 1. This is shown in FIGS. 9-19. These bars are especially suitable to transfer the position of the measurements points at vertical wall. The bars could then be positioned and fixed at this position to facilitate the positioning of the tool as shown in the FIGS. 9-11a, 12-14.

As shown in FIG. 14 it is possible to use one the leg arrangement on one side of the tool together with the bar to perform the measuring. The bar or bars 30 could be slidably arranged within the longitudinal side of the frame 3. The bars could be integrated in the frame when not in use and pulled out when positioning the tool 1. The bar or bars 30 could also be removed from the tool 1.

The functioning of the tool 1 will be now be described by reference to the FIG. 9-19.

In a conventional scenario, the user will measure the outlet positions on the wall or similar, write them or memorize them or write down the measurements on a piece of paper, and then repeat measurements on the respective tiles 31 that will be lined over the wall section comprising said outlets. If the positions are incorrectly marked, the board may become unsuitable for use, moreover, the conventional process requires taking multiple measurements. In contrast, the present invention in its simplest sense obviates the requirement of measurements. The user uses the grid 6 for recording actual positions of the outlets—the grid 6 then serves as a sort of stencil for transferring the recorded actual positions of the outlets on the respective tile 31 or a plurality of tiles 31. The process is thus highly simplified and the probability of human errors significantly reduced. A process of transferring the recorded positions on a tile is demonstrated in FIG. 9-19.

When the tool 1 is being used, the tool 1 is put up against the construction with the outlets to the measured. This could for instance be a floor, wall, ceiling or similar construction element where the tile 31 is going to be mounted. The tool 1 have the same position as the tile 31 is intended to be mounted. The leg arrangement 2 is placed with the spacer element 7a resting against a tile 31 already attached to the construction element. (shown in FIG. 18). The spacer element 7a could also be resting against a constructional element arranged perpendicular to the construction element to be measured and that also contains the cut outs 34. This will be the case at the beginning of the mounting of the tiles 31, where there are no prior tiles 31 mounted on the construction element.

The tool 1 has then the equal position as the tile 31 to be mounted will have. The transferring of the cut out positions 34 is made from the construction frame to the tool in this position.

The tool 1 is then removed from the wall, floor, ceiling or similar place where the tile 31 is to be mounted and placed on the tile or tiles 31 to be mounted. The tool will be positioned at the position where the cut out 34 is to be performed on the tile or tiles. The other side of the spacer element 7a will then contact the tile so that the same position is obtained. (shown in FIG. 14) The spacer element having a width equal to normal desired spacing between two adjacent mounted tiles so that the tool obtains the same positions when transferring the measuring reference to the tool and then transfer the same position to a tile to be mounted.

The spacer element 7a contacts the side of the tiles 31 at the opposite sides of the spacer element 7a when receiving the cut out positions and transferring the same cut out positions to the tool by taken into account the width between two adjacent tiles.

The frame could preferably have the same shape as the shape of the tiles 31 or a small number of tiles 31 arranged adjacent each other, but other arrangements are possible.

The spacer element 7a of the tool 1 makes it simple for the user to align tool so that it has the same position on the tiles 31 as it has on the place to be measured. After the simple alignment, the user may proceed to transfer the positions on the board.

This could be done for instance by the templates 20, 21 which is positioned at the cut out positions 34. The positions for the cut-out 34 could then be transferred to the tiles 31 by using a marking instrument 20, 21, 33. Possible embodiments of the marking instrument include, pen, pencil, stamp, other ink based instruments 33, a cutting tool such as blade, sharp tipped chisel, and their likes.

FIG. 9-11a shows several templates 20, 21, circular and L-shaped that could be arranged on the grid 6 to position the outlet. The templates 20, 21 could have a standard shape corresponding to the most common shapes of the outlets to be made. This makes the marking of the outlets and transferring of the measurement to the tiles 31 easier.

FIG. 8 shows the tool 1 viewed from below and with the first leg part 8 pushed inside the leg arrangement 2 so that only the end portion 7 of the respective first leg part 8 is visible. In this position, the frame 3 and grid is pushed down towards the tiles 31 as far as possible. The flexible leg arrangement 2 makes it easier for transferring of the cut-outs as the surface that are to be measured not always are planar. This makes it easier to transfer the cut-outs to/from in an uneven surface.

The present invention has been described with reference to a preferred embodiment and some drawings for the sake of understanding only and it should be clear to persons skilled in the art that the present invention includes all legitimate modifications within the ambit of what has been described hereinbefore and claimed in the appended claims.

The invention claimed is:

1. A tool for transferring positions of a measuring reference from a construction frame to a surface of a tile or a number of adjacent tiles for making cut-outs in the tile or tiles, the tool comprising a frame-like structure and a grid structure having openings in a raster pattern or a grid pattern made up by laser beams, the grid structure, or pattern extending between elements of the frame-like structure, wherein the tool further comprises at least one leg arrangement with an end portion, the end portion having a spacer element having a width equal to normal spacing between two adjacently mounted tiles or between a mounted tile and a construction element, such that when measuring the position for the cut-out to be transferred, when transferring the cut out positions to the tile or tiles to be mounted, the end portion is adapted to rest against a mounted tile or an end construction element at the opposite side of the spacer element.

2. The tool according to claim 1, wherein the leg arrangement further comprises a first leg part and a second leg part telescopically coupled to each other, the first leg is arranged within the second leg and adapted to move within the first leg.

3. The tool according to claim 2, wherein the second leg part (9) is biased outwardly from the first leg part.

4. The tool according to claim 1, wherein the second leg part and the first leg part are coupled to each other through a resilient member, such as a spring.

5. The tool according to claim 1, wherein the tool having four leg arrangements extending from each of the corners of the tool, the leg arrangements are adapted to extend or retract within the frame like structure independently of each other.

6. The tool according to claim 1, wherein the at least one leg arrangement having replaceable profiles with different widths of the spacer element.

7. The tool according to claim 1, wherein the leg arrangement is attached to the frame by internal screw-thread.

8. The tool according to claim 1, wherein the leg arrangement is attached to the frame by a snap coupling.

9. The tool according to claim 1, wherein the at least one leg arrangement is slidably arranged within a rail, the rail being attached to the frame.

10. The tool according to claim 1, wherein the tool comprising a handle arranged at the opposite side of the frame like structure from the leg arrangement.

11. The tool according to claim 1, wherein the tool further comprising at least a pair of oppositely arranged positioning device for additional measurement of the position of the tool, the positioning devices are arranged at the outside of at least two opposite sides of the frame like structure, the at least one positioning device (32) is slidingly connected to the sides.

12. The tool according to claim 1, wherein the grid structure or pattern is transparent.

13. The tool according to claim 1, wherein the tool further comprises at least one bar slidingly attached to the frame.

14. The tool according to claim 1, wherein the tool further comprises an alignment part movable attached to the side of the frame for aligning the tool against uneven tiles.

15. A system for measuring cut out positions for tiles comprising a tool according to claim 1, and a magnet template for attaching to the grid structure.

* * * * *